(12) United States Patent
Davies et al.

(10) Patent No.: US 12,444,294 B2
(45) Date of Patent: *Oct. 14, 2025

(54) COMMUNITY SECURITY SYSTEM USING INTELLIGENT INFORMATION SHARING

(71) Applicant: OutSmart Technologies, Inc., Encino, CA (US)

(72) Inventors: Christopher Paul Davies, Perth (AU); Scott Anthony Rhodes, Perth (AU)

(73) Assignee: OutSmart Technologies, Inc., Encino (CA)

( * ) Notice: Subject to any disclaimer, the term of this patent is extended or adjusted under 35 U.S.C. 154(b) by 0 days.

This patent is subject to a terminal disclaimer.

(21) Appl. No.: 18/388,504

(22) Filed: Nov. 9, 2023

(65) Prior Publication Data

US 2024/0144811 A1 May 2, 2024

Related U.S. Application Data

(63) Continuation of application No. 17/202,304, filed on Mar. 15, 2021, now Pat. No. 11,823,556, which is a
(Continued)

(51) Int. Cl.
*G08B 27/00* (2006.01)
*G06Q 30/06* (2023.01)
(Continued)

(52) U.S. Cl.
CPC ....... *G08B 27/003* (2013.01); *G06Q 30/0601* (2013.01); *G08B 13/196* (2013.01);
(Continued)

(58) Field of Classification Search
CPC .......... G08B 13/19697; G08B 15/00; G08B 25/008; G08B 25/009; G08B 25/016;
(Continued)

(56) References Cited

U.S. PATENT DOCUMENTS 4,746,906 A    5/1988 Lederer
5,089,704 A    2/1992 Perkins
(Continued)

FOREIGN PATENT DOCUMENTS

JP    2008242745 A    10/2008
JP    2008305038 A    12/2008
JP    2010152677 A    7/2010

*Primary Examiner* — Curtis A Kuntz
(74) *Attorney, Agent, or Firm* — Avyno Law P.C.

(57) ABSTRACT

The present invention relates to a community security system capable of monitoring multiple, generally adjacent, consecutive private security areas to confirm human activity and engage sensory alerts. The community security system includes at least two private security areas having the capability of being networked together to enable information sharing. Each private security area is monitored by a private security system and contains one or more detection devices for monitoring and detecting activity occurring within the boundaries of the private security area. Information detected by detection devices within the private security areas can then communicate with other detection devices within the private security area or with the community security system to confirm activity, track activity across adjacent boundaries, engage sensory alerts and notify community members or authorities, as needed.

20 Claims, 10 Drawing Sheets

Related U.S. Application Data continuation of application No. 16/536,240, filed on Aug. 8, 2019, now Pat. No. 10,950,119, which is a continuation of application No. 15/329,988, filed as application No. PCT/IB2015/002086 on Jul. 14, 2015, now Pat. No. 10,380,877.

(60) Provisional application No. 62/120,292, filed on Feb. 24, 2015, provisional application No. 62/033,404, filed on Aug. 5, 2014.

(51) Int. Cl.

| | |
|---|---|
| *G06Q 30/0601* | (2023.01) |
| *G08B 13/196* | (2006.01) |
| *G08B 15/00* | (2006.01) |
| *G08B 25/00* | (2006.01) |
| *G08B 25/01* | (2006.01) |
| *G08B 25/10* | (2006.01) |
| *H04L 67/12* | (2022.01) |
| *H04L 67/125* | (2022.01) |
| *H04L 67/50* | (2022.01) |
| *H04L 67/561* | (2022.01) |
| *H04N 5/76* | (2006.01) |
| *H04N 7/18* | (2006.01) |
| *H04N 23/69* | (2023.01) |
| *H04N 23/90* | (2023.01) |
| *H04W 4/90* | (2018.01) |
| *G08B 29/18* | (2006.01) |

(52) U.S. Cl.
CPC ...... *G08B 13/1963* (2013.01); *G08B 13/19656* (2013.01); *G08B 13/19669* (2013.01); *G08B 13/19671* (2013.01); *G08B 13/19697* (2013.01); *G08B 15/00* (2013.01); *G08B 25/008* (2013.01); *G08B 25/009* (2013.01); *G08B 25/016* (2013.01); *G08B 25/10* (2013.01); *G08B 27/00* (2013.01); *H04L 67/12* (2013.01); *H04L 67/125* (2013.01); *H04L 67/535* (2022.05); *H04L 67/561* (2022.05); *H04N 5/76* (2013.01); *H04N 7/181* (2013.01); *H04N 23/69* (2023.01); *H04N 23/90* (2023.01); *H04W 4/90* (2018.02); *G08B 25/005* (2013.01); *G08B 29/18* (2013.01); *G08B 29/185* (2013.01)

(58) Field of Classification Search
CPC ...... G08B 25/10; G08B 25/005; G08B 29/18; G08B 27/003; G08B 13/196; G08B 13/1963; G08B 13/19656; G08B 13/19669; G08B 13/19671; G08B 27/00; G08B 29/185; H04N 7/181; H04N 5/76; H04N 23/69; H04N 23/90; G06Q 30/0601; H04L 67/12; H04L 67/125; H04L 67/535; H04L 67/561; H04W 4/90
See application file for complete search history.

(56) References Cited

U.S. PATENT DOCUMENTS

| | | | |
|---|---|---|---|
| 5,332,902 A | 7/1994 | Bellis | |
| 5,557,106 A | 9/1996 | Ioco | |
| 5,929,445 A | 7/1999 | Barone | |
| 7,113,090 B1 | 9/2006 | Saylor et al. | |
| 7,115,871 B1 | 10/2006 | Tracy et al. | |
| 7,161,481 B2 | 1/2007 | Turner | |
| 7,221,267 B2 | 5/2007 | Chalker et al. | |
| 7,488,941 B2 | 2/2009 | Lee et al. | |
| 8,346,624 B2 | 1/2013 | Goad et al. | |
| 8,626,616 B2 | 1/2014 | Eich | |
| 8,655,593 B1 | 2/2014 | Davidson | |
| 8,970,374 B2 | 3/2015 | Guetta et al. | |
| 9,347,789 B2 | 5/2016 | Briant | |
| 9,398,413 B1 | 7/2016 | Scalise et al. | |
| 9,654,570 B2 | 5/2017 | Bisdikian et al. | |
| 10,073,929 B2 | 9/2018 | Vaynriber et al. | |
| 10,242,561 B1 | 3/2019 | Davies et al. | |
| 10,380,877 B2 | 8/2019 | Davies et al. | |
| 10,713,928 B1 | 7/2020 | Gerstberger et al. | |
| 10,769,692 B2 | 9/2020 | Davies et al. | |
| 10,776,528 B1 | 9/2020 | Vega | |
| 10,950,119 B2 | 3/2021 | Davies et al. | |
| 2002/0126009 A1 | 9/2002 | Oyagi et al. | |
| 2002/0147006 A1 | 10/2002 | Coon et al. | |
| 2003/0023411 A1 | 1/2003 | Witmer et al. | |
| 2003/0184436 A1* | 10/2003 | Seales ............... | G08B 25/016 |
| | | | 340/541 |
| 2004/0119590 A1 | 6/2004 | Wang | |
| 2004/0129883 A1 | 7/2004 | Dougherty et al. | |
| 2005/0012613 A1 | 1/2005 | Eckstein et al. | |
| 2005/0057361 A1 | 3/2005 | Giraldo et al. | |
| 2005/0125118 A1 | 6/2005 | Chalker et al. | |
| 2005/0237176 A1 | 10/2005 | Hammett | |
| 2005/0285730 A1 | 12/2005 | Turner | |
| 2006/0109113 A1 | 5/2006 | Reyes et al. | |
| 2006/0201964 A1 | 9/2006 | DiPerna et al. | |
| 2006/0271952 A1 | 11/2006 | Gurley et al. | |
| 2007/0018106 A1 | 1/2007 | Zhevelev et al. | |
| 2007/0096902 A1 | 5/2007 | Seeley et al. | |
| 2007/0109115 A1 | 5/2007 | Kiani et al. | |
| 2007/0146127 A1 | 6/2007 | Stilp et al. | |
| 2007/0152807 A1 | 7/2007 | Huang et al. | |
| 2007/0218895 A1 | 9/2007 | Saito et al. | |
| 2007/0239566 A1 | 10/2007 | Dunnahoo et al. | |
| 2007/0256105 A1 | 11/2007 | Tabe | |
| 2008/0042832 A1 | 2/2008 | Dipoala | |
| 2008/0177646 A1 | 7/2008 | Frink | |
| 2009/0285369 A1 | 11/2009 | Kandala | |
| 2010/0124900 A1 | 5/2010 | Lui et al. | |
| 2010/0171607 A1 | 7/2010 | Sharma et al. | |
| 2010/0238194 A1 | 9/2010 | Roach | |
| 2010/0281161 A1 | 11/2010 | Cohn et al. | |
| 2010/0289644 A1 | 11/2010 | Slavin et al. | |
| 2011/0046920 A1 | 2/2011 | Amis | |
| 2011/0111728 A1 | 5/2011 | Ferguson et al. | |
| 2011/0137818 A1 | 6/2011 | Goad et al. | |
| 2011/0246338 A1 | 10/2011 | Eich | |
| 2011/0319051 A1 | 12/2011 | Reitnour | |
| 2012/0092161 A1 | 4/2012 | West | |
| 2012/0146791 A1 | 6/2012 | Naidoo et al. | |
| 2012/0154138 A1 | 6/2012 | Cohn et al. | |
| 2012/0225635 A1 | 9/2012 | Esbensen | |
| 2012/0230629 A1 | 9/2012 | Hill et al. | |
| 2012/0252399 A1 | 10/2012 | Saito et al. | |
| 2013/0099124 A1 | 4/2013 | Filson et al. | |
| 2013/0157612 A1 | 6/2013 | Cordero et al. | |
| 2013/0183924 A1 | 7/2013 | Saigh et al. | |
| 2014/0019768 A1 | 1/2014 | Pineau et al. | |
| 2014/0028473 A1 | 1/2014 | Ryan et al. | |
| 2014/0071274 A1 | 3/2014 | Golden | |
| 2014/0118140 A1 | 5/2014 | Amis | |
| 2014/0136379 A1 | 5/2014 | Smith et al. | |
| 2014/0149032 A1 | 5/2014 | Barrett et al. | |
| 2014/0167955 A1 | 6/2014 | Mahajan | |
| 2014/0195664 A1 | 7/2014 | Rahnama | |
| 2014/0232874 A1 | 8/2014 | Meyer | |
| 2014/0266669 A1 | 9/2014 | Fadell et al. | |
| 2014/0278281 A1 | 9/2014 | Vaynriber et al. | |
| 2014/0361874 A1 | 12/2014 | Mandalapu | |
| 2014/0364081 A1 | 12/2014 | Rauner et al. | |
| 2014/0365614 A1 | 12/2014 | Branson et al. | |
| 2014/0368601 A1 | 12/2014 | deCharms | |
| 2014/0378167 A1 | 12/2014 | Haney | |
| 2015/0081207 A1 | 3/2015 | Briant | |
| 2015/0170505 A1* | 6/2015 | Frew ............... | G08B 25/10 |
| | | | 340/539.22 |
| 2015/0180986 A1 | 6/2015 | Bisdikian et al. | |
| 2015/0319592 A1 | 11/2015 | Stadtlander et al. | |

(56) References Cited

U.S. PATENT DOCUMENTS

| | | |
|---|---|---|
| 2015/0334545 A1 | 11/2015 | Maier et al. |
| 2016/0012639 A1 | 1/2016 | Park et al. |
| 2016/0027292 A1 | 1/2016 | Kerning |
| 2016/0119424 A1* | 4/2016 | Kane ................ G08B 25/08 709/203 |
| 2017/0103644 A1 | 4/2017 | Chauhan et al. |
| 2018/0096569 A1 | 4/2018 | Eaton et al. |
| 2020/0105123 A1 | 4/2020 | Davies et al. |

* cited by examiner

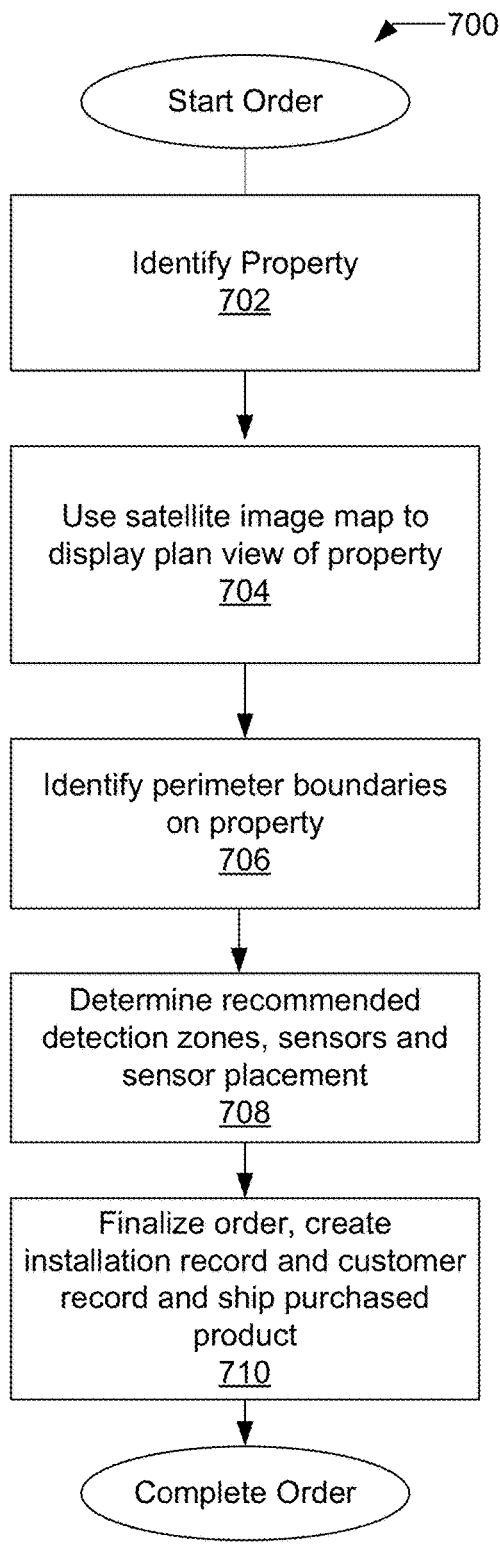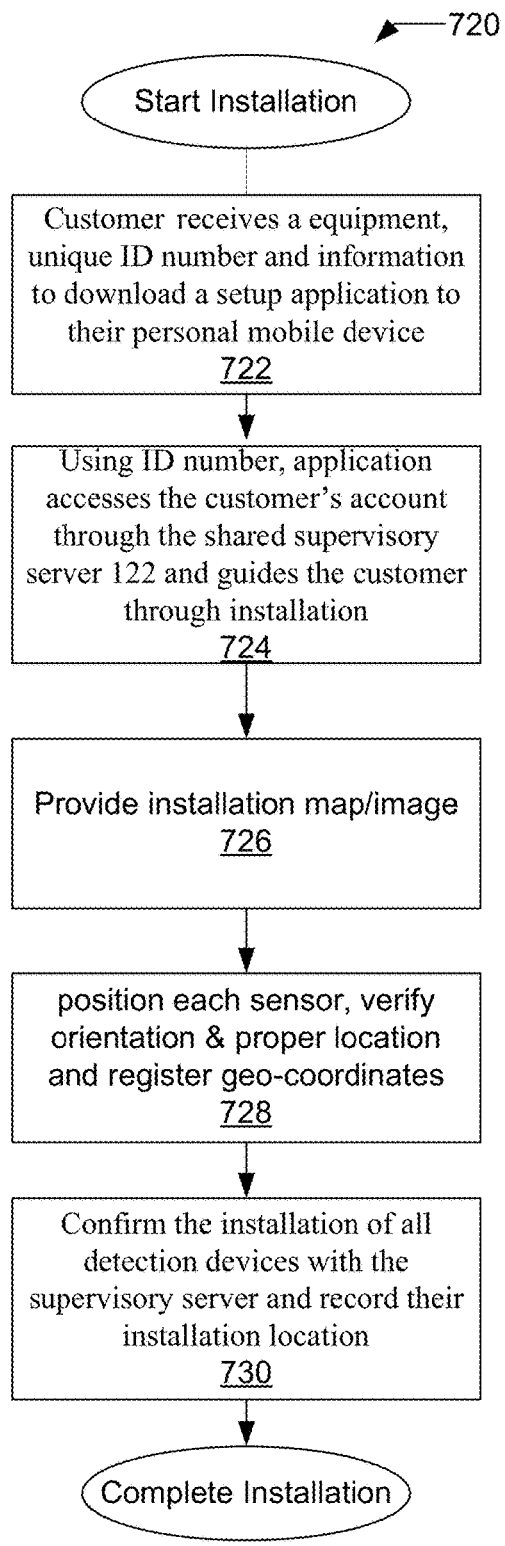
FIG. 7a
FIG. 7b

COMMUNITY SECURITY SYSTEM USING INTELLIGENT INFORMATION SHARING

CROSS-REFERENCE TO RELATED APPLICATIONS

This application is a continuation of and claims priority to U.S. patent application Ser. No. 17/202,304, filed Mar. 15, 2021, titled COMMUNITY SECURITY SYSTEM USING INTELLIGENT INFORMATION SHARING, which application is a continuation of and claims priority to U.S. patent application Ser. No. 16/536,240, filed Aug. 8, 2019, (now U.S. Pat. No. 10,950,119), titled COMMUNITY SECURITY SYSTEM USING INTELLIGENT INFORMATION SHARING, which application is a continuation of and claims priority to U.S. patent application Ser. No. 15/329,988, filed Jan. 27, 2017, (now U.S. Pat. No. 10,380,877), titled COMMUNITY SECURITY SYSTEM USING INTELLIGENT INFORMATION SHARING, which is a 371 national stage patent application that claims priority to International Application No. PCT/IB2015/002086, filed Jul. 14, 2015, titled COMMUNITY SECURITY SYSTEM USING INTELLIGENT INFORMATION SHARING, which claims priority of U.S. Provisional Patent Application Ser. No. 62/120,292, filed on Feb. 24, 2015, titled COMMUNITY SECURITY SYSTEM USING INTELLIGENT INFORMATION SHARING and U.S. Provisional Patent Application Ser. No. 62/033,404, filed on Aug. 5, 2014, titled A SYSTEM TO DETECT AND DETER INTRUDERS WHEN THEY ENTER A PRIVATE AREA WITHIN A COMMUNITY, which applications are incorporated by reference in this application in their entirety.

RELATED APPLICATIONS

1. Field of the Invention

This application relates generally to security systems and, more particularly, to community-based security systems using intelligent information gathering, processing and sharing.

2. Background

During the hours of darkness or other periods of vulnerability, a physically secured building and/or other type of restricted zone is left susceptible to break-ins or other forms of attack due to an intruders' belief that these areas are unattended and therefore, the intruder is unlikely to be discovered.

Conventional intruder alarm systems will only detect the intruder once they have breached the physically secured building. An intruder relies on the knowledge that even when a conventional alarm system is triggered there is an expected minimum response time that provides a window of opportunity for the intruder to conduct their illicit activities. If the building is still occupied when the intruder enters, there is a high chance that a confrontation will occur without the owner/authorized person receiving any prior warning. This may lead to a violent act.

A conventional alarm system could be configured with external alarm sensors to provide an earlier alarm detection of a potential intruder. A problem with this method is the potential for false alarm triggers caused by the external environmental conditions being difficult to predict and control. These false alarms cause the owner/authorized user and security monitoring company to lose confidence in the conventional alarm system as a reliable indicator of an intruder incursion leading to the conventional alarm system no longer being armed making the security system mute.

A conventional alarm system is limited in its notification and is usually reliant on a security monitoring company to receive the alarm status and coordinate contact with the key holders, which may not be available at that time preventing a desired response and in some countries preventing an official response, such as police response. This is usually an ongoing charged service with recurring monthly or annual fees. In most instances, the security monitoring company is not located in the same area/state, reducing its familiarity with the property under attack or the neighborhood in which it is located. This can have major impact on the execution and management of a suitable response. In the case of the more frequent trend of an intruder entering a property while it is still occupied, the conventional alarm system is usually not even armed due to the problems of setting up the alarm zones suitable for that time of day.

A need therefore exists for an intelligent community-based system that can more effectively, quickly and intelligently monitor activities with private zones in a community and share relevant information with adjacent or consecutive zones within the community, creating an overall enhanced and highly effective security system.

SUMMARY

The present invention relates to a community security system capable of monitoring multiple, generally adjacent, consecutive private security areas to confirm human activity and engage sensory alerts. The community security system includes at least two private security areas having the capability of being networked together, directly and/or indirectly through a shared server, to enable information sharing.

Each private security area is monitored by a private security system and contains one or more detection devices for monitoring and detecting activity occurring within the boundaries of the private security area. Information detected by detection devices within the private security areas can then communicate with other detection devices within the private security area or with the community security system to confirm activity, track activity across adjacent boundaries, engage sensory alerts and notify community members or authorities, as needed.

In one example of an implementation, the private or community security systems may be in communication with the system users, via personal mobile devices, to provide real-time, alerts to the system users, community or group members. The security systems may further be in communication with, and managed by, a server that is able to intelligently monitor all activities within the system and communicate, as necessary, to individual users and/or community or group members. Geo-coordinate references associated with each of the members of the community or individual private security areas as well as the location of the detection devices within the community and/or private security areas may be used to enhance the effectiveness of the system.

Optionally, the community system could group external cameras to create a community CCTV network accessible by all the community group members to provide access to live camera views, camera movement control and provide video history review to all of the community group members.

Other devices, apparatus, systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The invention may be better understood by referring to the following figures. The components in the figures are not necessarily to scale, emphasis instead being placed upon illustrating the principles of the invention. In the figures, like reference numerals designate corresponding parts throughout the different views.

FIG. 7a depicts a flow diagram showing one example of an automated method for determining how to set-up a private security system in a private security area.

FIG. 7b depicts a flow diagram showing one example of an automated method for determining how to install a private security system in a private security area.

DETAILED DESCRIPTION

Figure 1:
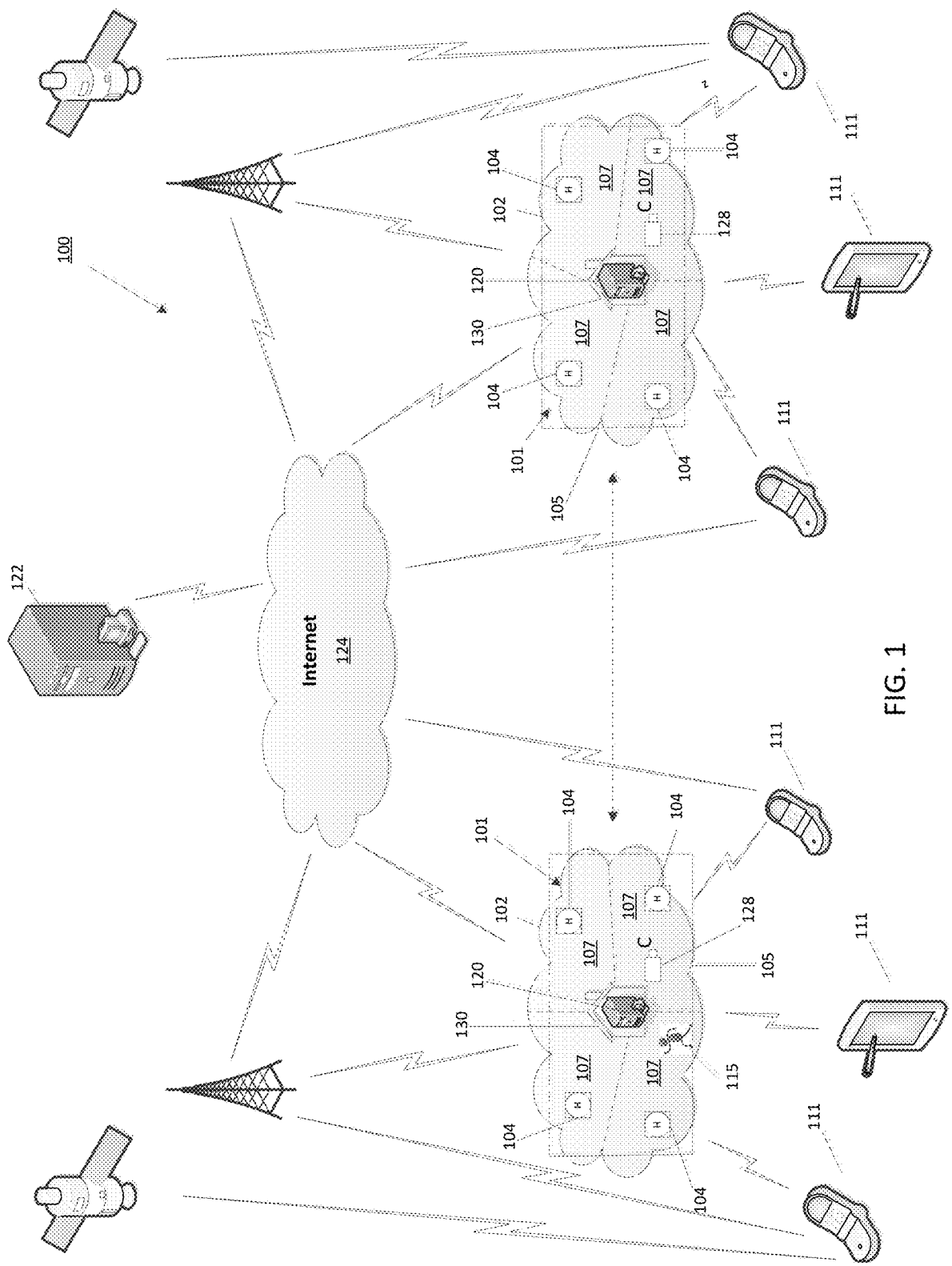
FIG. 1 illustrates a communication network for a community security system of the present invention.

As described in FIG. 1 and will further described below in connection with FIG. 2-10, the present invention relates to a community security system 100 capable of monitoring multiple, generally adjacent, consecutive private security areas 102 in a community to confirm human activity, engage sensory alerts 309, 310 (see FIG. 3) and determine the intelligent selection and/or automation of relevant equipment, such as a community CCTV camera 128. Each private security area 102 in the community is generally monitored by a private security system 101 that monitors the area external to a residential home or business 130 within certain predetermined perimeter boundaries 105. The private security systems 101 have the capability of being networked together to enable information sharing, thereby creating an intelligent community security system 100. FIG. 1 illustrates one example of a communications network for the intelligent community security system 100.

Each private security system 101 in the community includes detection devices 104 that use a detection field of view to detect humans 115 moving within various pre-defined horizontally and/or vertically spaced detection zones 107 within the private security area 102. These detection zones 107 may be established by the overlapping of fields of view or separately defined detection planes determined during the installation process. Each private security area 102 is divided into various detection zones 107 monitored by one or more separate detection device 104. As illustrated in FIG. 1, any detection information may be shared with adjacent or consecutive private security areas 102 through network communications via a master device 120 and shared supervisory server 122.

Figure 3:
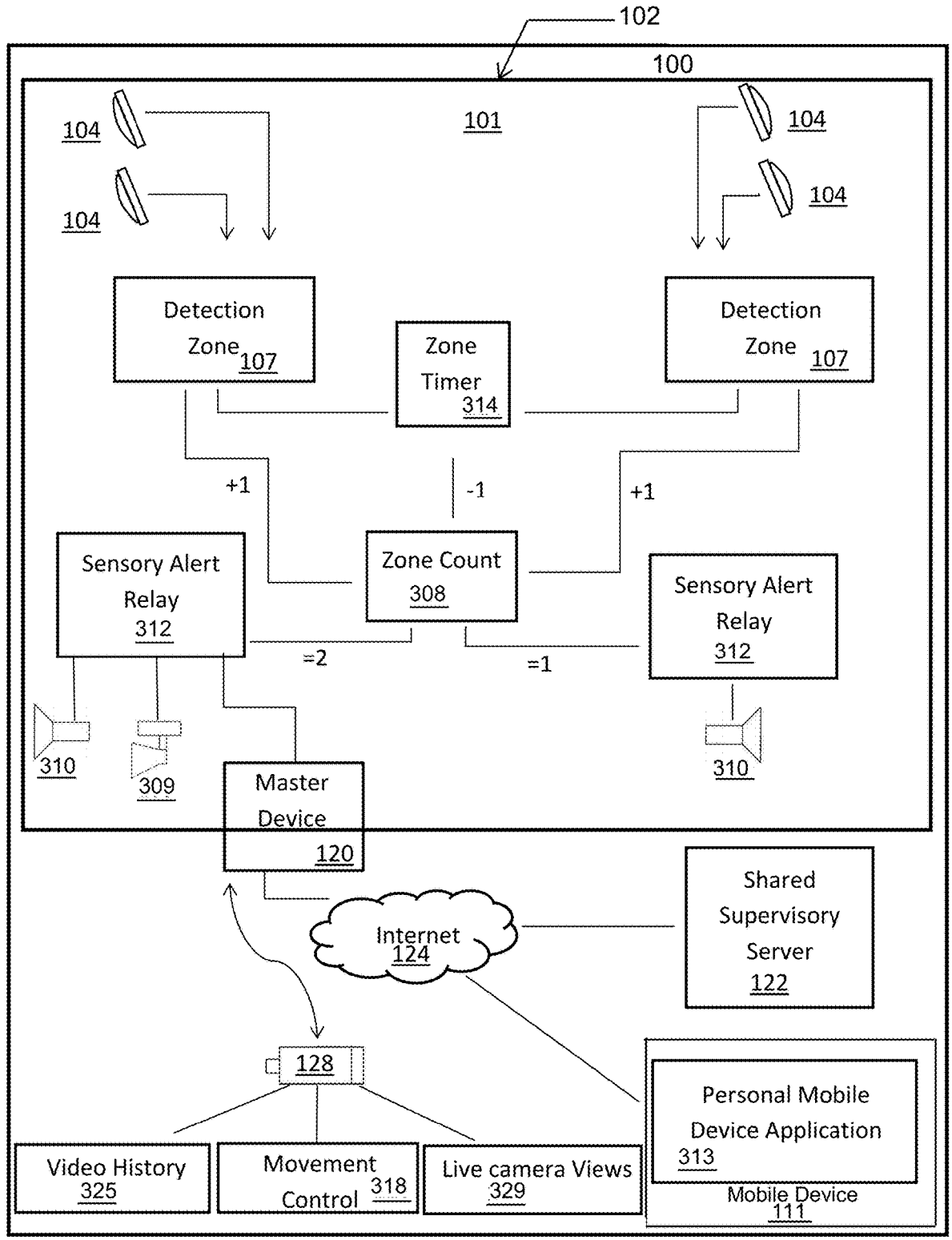
FIG. 3 is a block diagram of one example of an implementation of a private security system for monitoring a private security area in a community monitored as part of the community monitoring system of the present invention.

The detection devices 104 located within the private security areas 102 can communicate with other detection devices 104 in the private security area and with a master device 120 using a self-forming and propagating data communications network 401 (FIG. 4) formed between detection devices 104 and/or the master device 120 within the private security areas 102 and/or between adjacent or consecutive private security areas 102, using multiple redundant data pathways. The master device 120 could pass/act as a gateway to disperse this information via the Internet 124 to the shared supervisory server 122 for determination. As illustrated, the master device 120 can also communicate directly with user's mobile device 111 to disperse information to the user's from the system and/or gather user information relevant to the operations of the system. For purposes of this application, a "mobile device" is any computing device that provides internet and/or cellular phone access, and may include, but not be limited to phones, table computers, wearable computers (e.g, glasses, watches, head-mounted displays), personal digital assistants, calculators, cameras, pagers, personal navigation devices, robots, game consoles, media player, mobile personal computers, etc. Applications running on mobile devices may be referred to as personal mobile device applications 313 (FIG. 3).

In operation, information gathered by individual detection devices 104 can be shared across multiple security areas 102 within the community security system 100 to confirm human activity and engage sensory alerts 309, 310. This gathered and shared information allows for human activity to be monitored throughout a community and across adjacent private security areas 102. Real world geo-coordinate equipment tagging, real-time GPS co-ordinate referencing of personal mobile devices 111 and real-time data analysis may be used to manage the relevant community members for response and assess risk to individual properties or private security areas 102 within the community security system 100.

Geo-coordinate equipment tagging and pre-determined detection zones 107 can be attached to detection devices 104 within a community security system 100 during installation, which can be used to manage the relevant sharing of information throughout the community security system 100. Real-time GPS co-ordinate application 313 (FIG. 3) for personal mobile devices for individual users/community members may also be used to facilitate relevant notification of alarm detections (i.e., determine notification response times) and control other events, such as determining the intelligent selection and/or automation of relevant equipment and/or the arming and disarming of private security systems 101. Additionally, real-time GPS co-ordinates for personal mobile devices 111 can be obtained and used to respond to personal panic/distress calls by community members, which could also enable nearby private security systems 101 to activate sensory alerts 309, 310 and notify other nearby community security systems 100 of distress or alarm situations.

The private security systems 101 can be programed to enable the self-learning of general patterns that could, for example, enable automatic arming and disarming of the private security system 101 to occur automatically or notify users of variations within the general patterns when they occur to enable manual intervention.

The community security system 100 could include a community CCTV camera system by grouping external cameras 128 located on private security areas 102 or public community areas into a single camera network accessible by all of the community group members. The community CCTV network could then provide access to live camera views 329, camera movement control 318 and store and provide video history 325 review to all of the community security system 100 group members. (FIG. 3)

The various system particulars of the community security system 100 and the private security system 101 generally described above are described in further detail below in connection with the respective figures.

A. Physical System Overview

In general, the present invention relates to a community security system 100 where one or more private security areas 102 are being monitored and protected by individually networked private security systems 101.

A private security system 101 monitoring a private security area 102 can be a stand-alone system; however, the usefulness and functionality of the private security system 101, as explained below, can be greatly enhanced when single private security systems 101 monitoring private security areas 102 within a community are networked to create an intelligent community security system 100.

While not exclusive, the present invention can relate to the monitoring, detection and notification of security breaches employed in single private security systems 101 in private security areas 102, which can form the basis for a larger community security system 100. The employment of one example of a single private security system 101 in a private security area 102 is described below.

Figure 2:
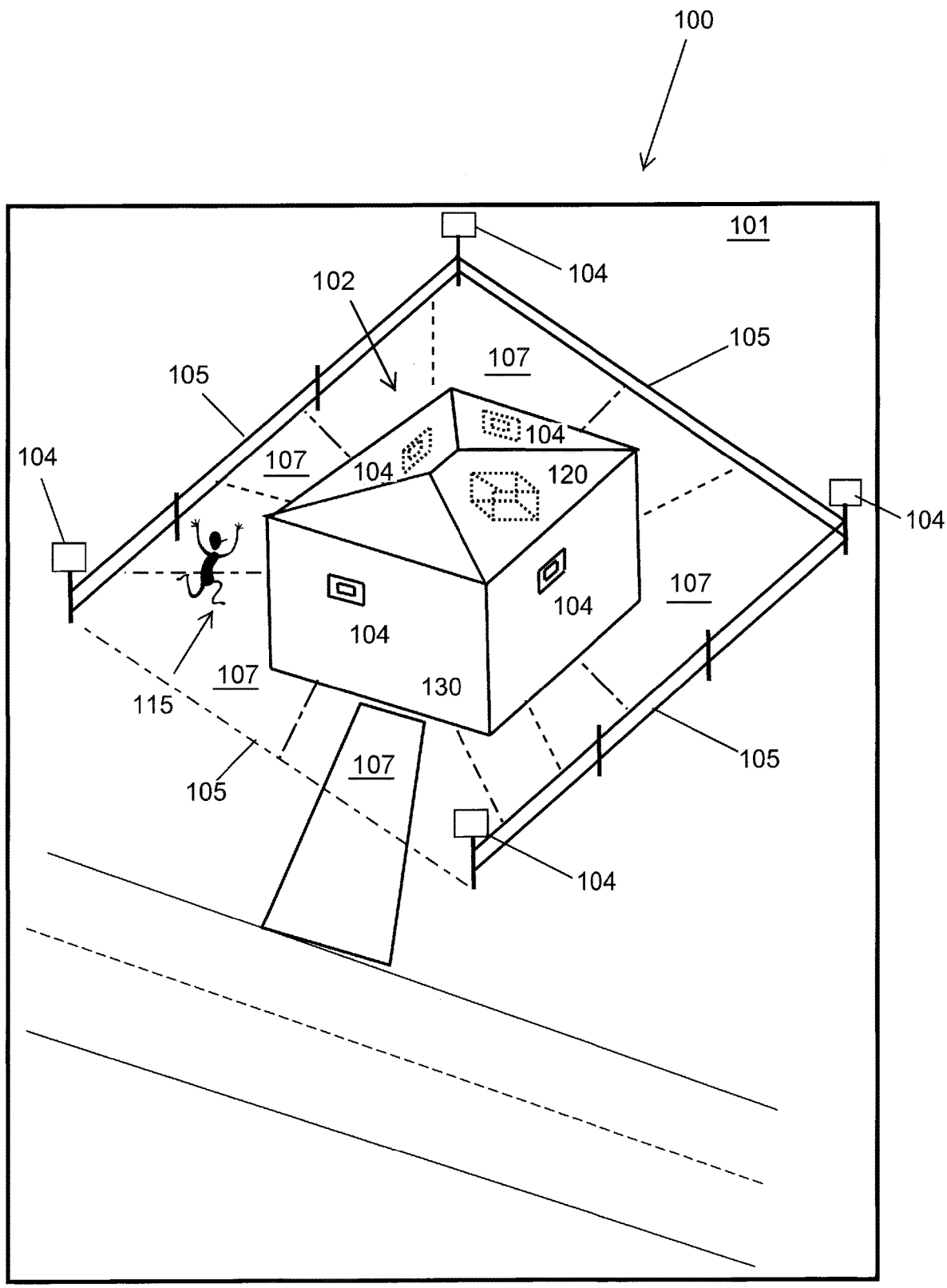
FIG. 2 plan view of a private security area forming part of the community security system of the present invention.

FIG. 2 illustrates a plan view of the private security area 102 of FIG. 1 that may be monitored by a private security system 101 of the present invention to notify the owners of the private security system 101 of the presence of intruders 115. The private security area 102 to be monitored is defined, generally, by the property lines or by a specified area within the property lines or extending around any protected area or structure 130. The monitored area defined by established perimeter boundaries 105 may be deemed a restricted area. In sum, the private security area 102 can be defined by the area that the private security system 101 owner requires monitoring by designating perimeter boundaries 105, which may surround, for example, a physical structure 130.

The private security system 101 used within each private security area 102, such as the area surrounding a home, may include one or more detection devices 104 installed around the outside walls of the physically secured building 130 and/or about the perimeter of the private security area 102. One or more detection devices 104 may be housed within the same housing. Detection devices 104 may include, but not be limited to, any of the following devices capable of monitoring movement, or assisting with, monitoring or detecting activity in a given area: security cameras, lights, motion sensors, beam sensors, door sensors, and/or other motion detectors, including but not limited to a passive infrared (PIR) detectors.

Two detection devices 104 may monitor the same area from different horizontally and/or vertically space separated perspectives. These detection zones 107 may be determined by the complete or partial overlapping of fields of view or space separated detection planes ascertained during the installation process or as a function of the physical construction of the housing containing multiple detection devices 104. When each detection zone 107 is monitored by at least two detection devices 104, the chances of false intruder 115 detection are greatly reduced. In this manner, detection devices 104 may be installed to form multiple detection zones 107 (first, second, third . . . detection zones) within a private security area 102, which may be around the outside of a secured building 130. The number of detection zones 107 in a given area may depend upon the size and shape of the private security area 102 being monitored.

Figure 4:
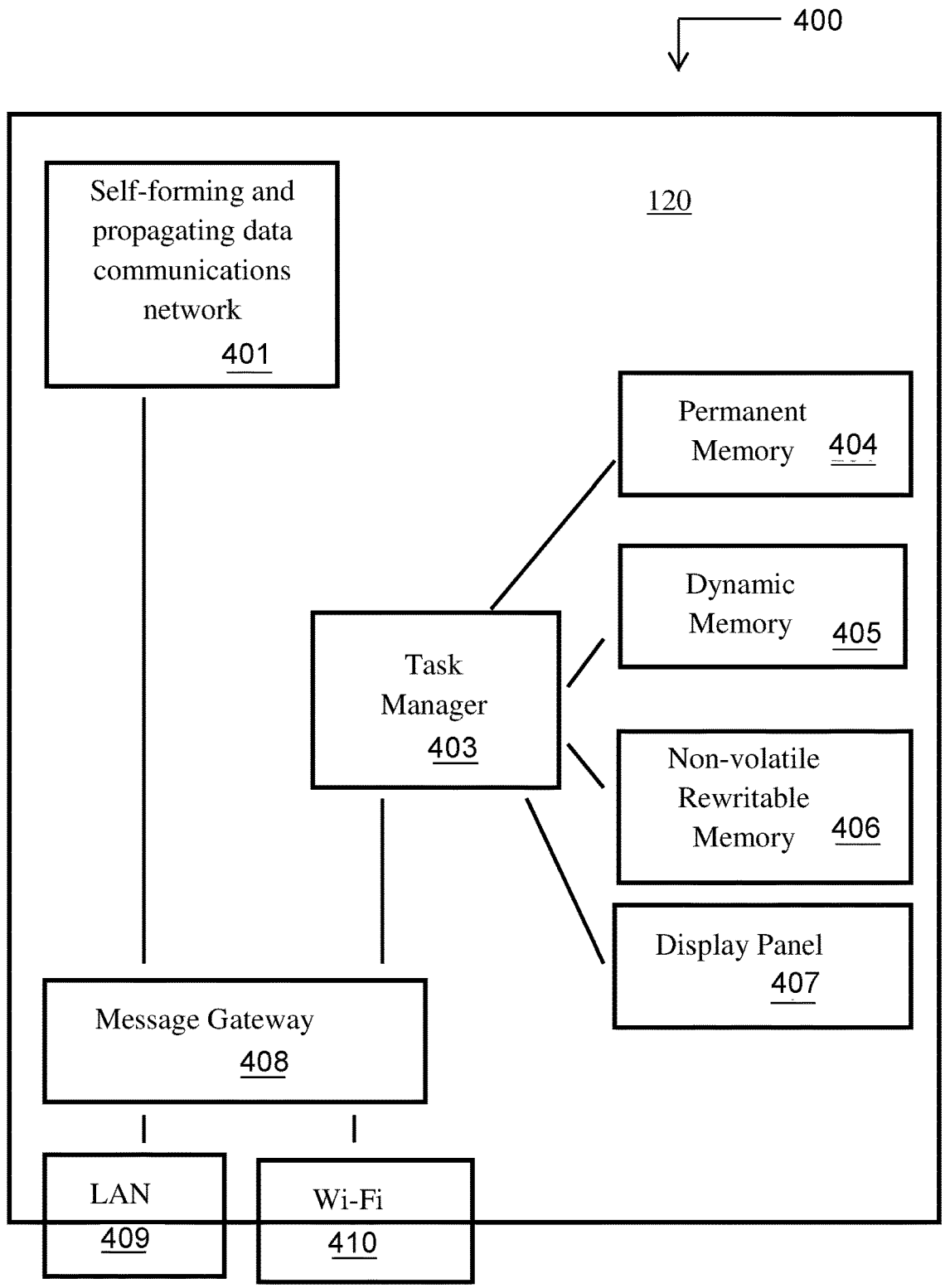
FIG. 4 depicts a block diagram of a master device of the private security system of FIG. 3.

The detection devices 104 may communicate with each other and/or the master device 120 using a self-forming and propagating data communications network 401 (See FIG. 4). This communications network 401 could be formed, for example, using a proprietary packet data radio transmission system. The detection devices 104 may be professionally installed or installed as a "Do-It-Yourself" system. The private security system 101 may be wired, wireless or both and powered through the grid or independently powered by battery or renewable energy, such as solar energy, or both.

A private security system 101 may also include or share a master device 120, which can be located within the physically secured building 130, an adjacent building, or elsewhere within the community and powered from the grid. The master device 120 may contain its own battery backup to overcome short-term power outages. The master device 120 may also use a self-forming and propagating data communications network 401 to communicate with the detection devices 104. The master device 120 could pass/act as a gateway to disperse information via the Internet 124 to the shared supervisory server 122 for determination. The master device 120 may also dynamically take on some of the duties that would otherwise be performed by the shared supervisory server 122 for such reasons as loss of Internet connectivity or diversification of the workload and duties within the normal operation of the community security system 100. The master device 120 may also provide community connectivity to the Internet 124 using the cellphone network such as 3G/4G or other known physical Internet gateways etc., as illustrated in FIG. 1.

The master device 120 may communicate with a shared supervisory server 122 via the Internet 124 to exchange information, detection status and other functions etc. The master device 120 and/or the shared supervisory server 122 may communicate with a user's mobile device 111. Application(s) 313 residing on the personal mobile devices 111 may provide a user interface to the community security system 100.

In the case of the private security system 101 family group members are generally mobile, so their physical GPS coordinates may also be monitored by their personal mobile devices 111. As the mobile device 111 knows its proximity to the private security area 102 it can notify the shared supervisory server 122 of events such as leaving the private security area 102 or arriving at the private security area 102 to assist with arming/disarming determinations. Application 313 on the mobile devices 111 can also perform the task of filtering notifications from the shared supervisory server 122 based on real-time GPS co-ordinates of the user and or user status such as administrator, home group membership etc. The shared supervisory server 122 may interrogate the personal mobile device 111 to determine the whereabouts of each member's personal mobile device 111. The shared supervisory server 122 could intelligently select which of any group members of a community or private security system will be contacted based on their physical location at the time of an intruder 115 detection. Either or both the shared supervisory server 122 or the master device 120 could also use the GPS co-ordinates of family members in the group for a variety of purposes, including arming and disarming of the system and intelligent learning of behavior patterns that could enhance or impact the performance of the private security system 101.

The private security system 101 could intelligently self-determine times of arming and disarming based on the comings and goings at the property, e.g., children arriving home from school. When a member's mobile device 111 GPS co-ordinates enters the vicinity of the private security area 102, the security at the front of the house may be disarmed for a set period. In this example, after the child enters the house, the private security system 101 could rearm and optionally notify the parent through their personal mobile device application 313 that the child is home. This determination or functionality could also be made by the shared supervisory server 122.

Turning now to FIG. 3, FIG. 3 depicts a diagram of one example of an implementation of a private security system 101 of the present invention in a private security area 102. As illustrated, the private security system 101 may include a number of different detection devices 104, including, but not being limited to, any of the following devices capable of monitoring movement, or assisting with, monitoring or detecting activity in a given area: security cameras, lights, motion sensors, beam sensors, door sensors, and/or other motion detectors, including, but not limited to, a passive infrared (PIR) detectors. Those skilled in the art will recognize that any number of different detection devices, used alone or in combination, may be used in connection with the present system 100. As one or more detection devices 104 may be housed within the same housing, detection devices 104 may operate in a stand-alone manner to monitor a detection zone 107. However, it is envisaged that two detection devices 104 would monitor the same detection zone 107 from different horizontally and/or vertically space separated perspectives. These detection zones 107 may be determined by the overlapping of fields of view or space separated detection planes ascertained during the installation process. As noted above, when each detection zone 107 is monitored by at least two detection devices 104, the chances of false intruder 115 detection are reduced.

The private security system 101 also includes a zone timer 314 and zone counter 308 in communication with sensory alert relays 312 used to trigger sensory alerts 309 and 310, such as lights or sirens. As explained further below, the zone timer 314, zone counter 308 are used to determine when to trigger the sensory alerts 309 and 310 via the sensory alert relay 312. The private security system 101 includes a master device 120 for communication with the detection devices 104.

As illustrated in FIG. 4, which is an example block diagram of the master device 120, the master device 120 may include a self-forming and propagating data communications network 401, a task manager or controller 403, permanent, dynamic and non-volatile memory 404, 405, 406 and 407, as well as display panel 407, message gateway 408 and LAN and/or WiFi connectivity 410. In this example, the detection devices 104 can communicate with each other and/or the master device 120 using the self-forming and propagating data communications network 401 to monitor, detect or help detect intruder 115 movement in the private security area 102.

Turning back to FIG. 3, the master device 120 may communicate with multiple types of detection devices 104 using the self-forming and propagating data communications network 401 and pass/act as a gateway to disperse this collected data to the shared supervisory server 122 via the Internet 124. The detection devices 104 could be detecting but the shared supervisory server 122 makes a determination as to whether or not these detections should be ignored, such as when the private security system 101 is in a disarmed state. Arming/Disarming of the private security system 101 may be accomplished via a user's/members personal mobile device application 313 either manually or by proximity using GPS co-ordinate references.

The shared supervisory server 122 may configure the community security system 100, aid in the monitoring of detection zones 107 and generate/receive notification from personal mobile device applications 313 that may be accessed via the Internet 124. The LAN 409/Wi-Fi router 410 may connect the private security system 101 with the Internet 124, while providing wireless internet capabilities to the private security area 102 and/or the community security system 100. Community CCTV cameras 128 may provide analog or digital video and this video may be formatted or reformatted into a common format for storage as video history 325. Movement control 318 and live camera views 329 may also be provided in connection with the CCTV cameras 128.

Detection devices 104, lights 310, and sirens 309 may be located outside of the building and cover the private security area 102. When an intruder 115 is detected in the private security area 102, the sensory alert relay 312 may be instructed to activate or otherwise turn on a light 310, siren 309, and/or other means of sensory alert to announce to the intruder that they have been detected in the private security area 102 prior to breaching the physically secured building 130 and/or other type of restricted zone. As such, the intruders' window of opportunity has already expired. Knowing this, the intruder 115 is more likely to leave the private area external to the physically secured building 130 and/or other type of restricted zone without perpetrating a criminal act minimizing the risk of financial loss/damage or a personal injury occurring due to a violent act.

In one example, during operation, a detection device 104 may detect an intruder 115 in the private security area 102 and signals the master device 120 using the self-forming and propagating data communications network 401 that there has been a detection. The master device 120 passes/acts as a gateway to disperse this information on to the shared supervisory server 122 via the Internet 124 for processing. If a second detection device 104 is triggered within the private security area 102 at the same time and location (which can be determined by the detection devices 104 geo-coordinate tagging), the shared supervisory server 122 determines the existence of a detection zone 107. A zone timer 314 is activated and a count of one is added to the zone count 308. The sensory alert relay 312 is then activated, turning on a strobe light 109. If a community CCTV camera 128 has been installed at a nearby location, determined by the camera's 128 own GPS co-ordinate, the shared supervisory server 122 engages the camera's 128 movement controls 318 to position the camera 128 by calculating a vector direction and distance for that CCTV camera 128 to best observe the triggered detection zone 107. This instruction is sent via the Internet 124 and LAN 409/Wi-Fi router 410 so that the community CCTV camera 128 is positioned to best view the scene. The community CCTV camera 128 outputs live camera views 329 and saves video history for later review 325.

If there are no further triggers of an overlapping detection zone 107 within a given period, the zone timer 314 then resets and takes one away from the zone counter 308. The CCTV camera 128 is directed by the shared supervisory server 122 via the Internet 124 and LAN 309/Wi-Fi router 310 to return to its normal home position.

If a second detection zone 107 is determined before the zone timer 314 is reset, then the response is escalated. If available, the community CCTV camera 128 continues to monitor the scene outputting live camera views 329 and recording video history 325. The zone count 308 now equals two so the sensory alert relay 312 triggers all lights 110 and sirens 109 to activate within the bounds of the private security area 102. The shared supervisory server 122 determines that an intruder 115 has been confirmed and notification is sent to the closest responder and the system administrator through their personal mobile device application 313. The closest responder is determined by checking the GPS coordinates of each responder's personal mobile devices 111 or the individual personal mobile device application 113 determining whether this responder is close enough to respond. Responders may also be notified via email, text messaging, telephone, to provide a few, but not exhaustive, examples.

In the above example, those skilled in the art will recognize that the master device 120 may also dynamically take on some of the duties that would otherwise be performed by the shared supervisory server 122 for such reasons as loss of Internet connectivity or diversification of the workload and duties within the normal operation of the community security system 100. Throughout the applications, operations described as performed by the supervisory server 122 should not be so limited and may be performed by the master device 120.

Turning again to FIG. 4, the primary function of the master device 120 could be considered as a bi-directional data gateway between the self-forming and propagating data network 401 and the shared supervisory server 122. The master device 120 may include permanent memory 404 which is ROM or re-programmable and contains the firmware for the master device 120 functions, dynamic memory 405 such as RAM to store data values and instructions for use by and during the execution of the firmware and non-volatile rewriteable memory such as HDD or SSD 406 to hold information such as the customer record database, alarm status etc.

The master device 120 has the ability to facilitate detection device 104 communications between each other and the master device 120 using the self-forming and propagating data communications network 401. The communication route between each of the detection devices 104 and the master device 120 is dynamic. All detection devices 104 find a data route back to a master device 120. If the closest master device 120 is unavailable for any reason, such as a loss of power or failure, then the detection devices 104 will continue to pass messages via the self-forming and propagating data communications network 401 between each other until the route to another master device 120 is determined. This self-forming and propagating data communications network 401 uses a non-specific routing protocol which could be formed, for example, using a proprietary packet data radio transmission system.

The master device 120 includes a message gateway 408, which facilitates the passing of communications internally within the master device 120. The message gateway 408 may also pass/receive messages from the detection devices 104, lights 310 sirens 309 and/or other sensory alert means via the self-forming and propagating data communications network 401. The message gateway 408 may also pass messages externally via LAN 409 and/or Wi-Fi 410 over the Internet 124 to the shared supervisory server 122 (FIGS. 1 and 3) and/or individual users through their personal mobile devices 111 (FIGS. 1 and 3). The LAN 409 and/or Wi-Fi 410 modules may physically reside within or be external to the master device 120.

The master device 120 includes a task manager or controller 403, which may be responsible for the internal management of the master device 120. The task manager 403 may co-ordinate tasks such as the syncing of customer records with the shared supervisory server 122, managing firmware updates, and collecting alarm status if the shared supervisory server 122 is off-line due to for example, power or internet loss. The collected alarm records may be forwarded on to the shared supervisory server 122 once communication is re-established. A display panel 407 such as a touch display may be used with the master device 120 to provide a user interface to setup and configure the master device 120, the private security system 101 and or the community security system 100.

As noted above, the master device 120 may dynamically take on some of the duties that would otherwise be performed by the shared supervisory server 122 for such reasons as loss of internet connectivity or diversification of the workload and duties within the normal operation of the community security system 100.

Figure 5:
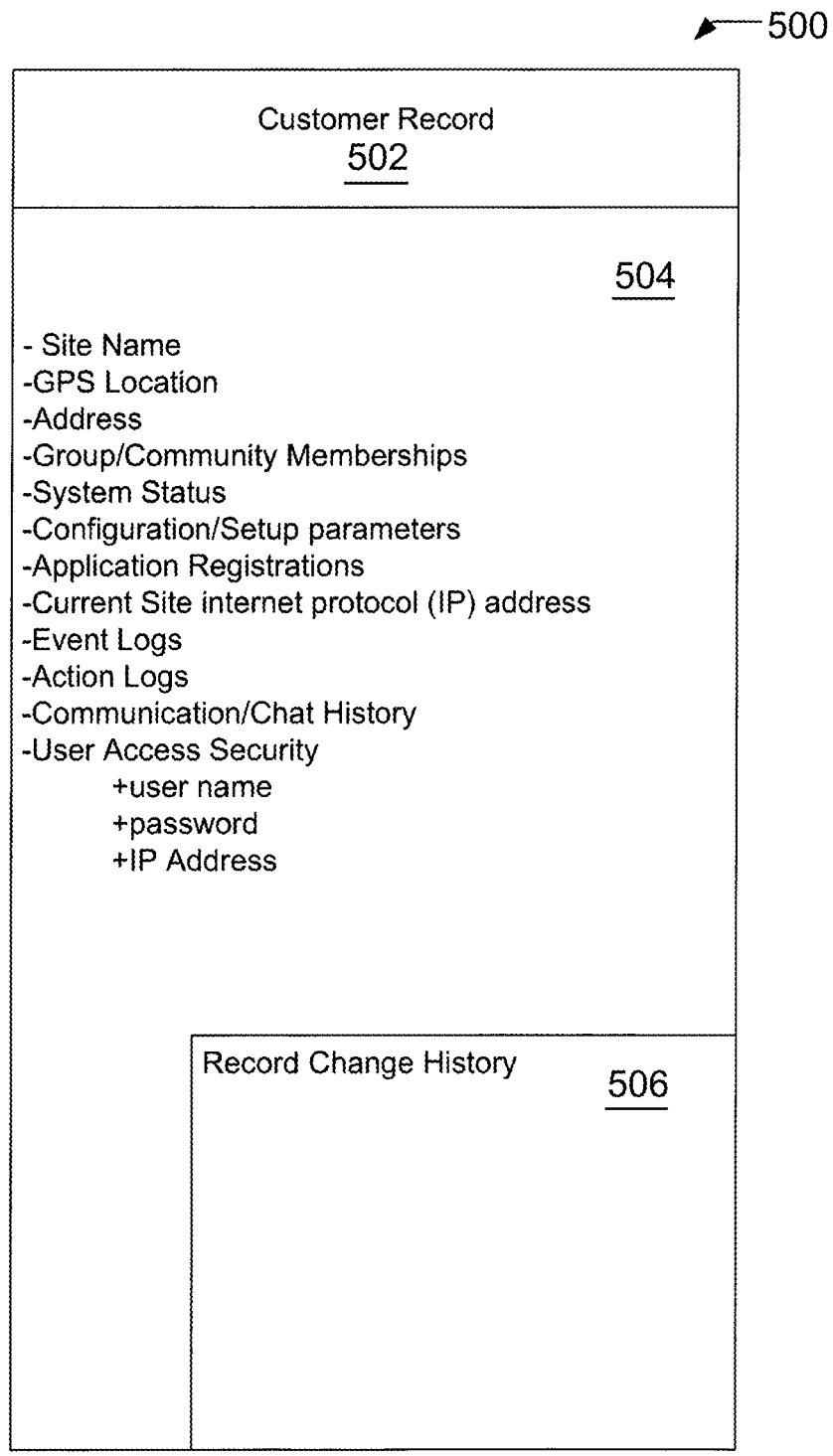
FIG. 5 illustrates an example customer record stored in the database of the shared supervisory server of the community monitoring system.

FIG. 5 is one example of a customer record that may be stored in the system database (not shown) of shared supervisory server 122. The customer record 502 may have text fields 504 for identification of site name, GPS location, address, group/community memberships, system status, configuration/setup parameters, application registrations, current site internet protocol (IP) address, event logs, action logs, communication/chat history, and user access security. The customer record 502 may also keep track of changes to the database record in a record change history filed 506. Additional or few fields may be used and are typically dependent upon implementation. The database may be implemented as a flat file, liked lists or other data structure, or a relational database such as SQL. The database record may be located at the shared supervisory server 122.

The private security system 101 may be designed to use very low power consumption (replaceable battery and/or solar or other renewable battery charging solutions) and be wirelessly installed as a 'Do-It-Yourself' security system using the two stage fixing system with the personal mobile device application 313 for installation guidance. The two stage fixing system would comprise an instant adhesive as a primary fixer such as double sided tape for positioning/locating detectors to a wall or fence making it possible for the secondary fixing system such as a durable liquid adhesive, screws, nails etc. to cure or be installed.

In operation, once an intruder 115 has been detected within a detection zone 107 the first detection device 104 could use its associated sensory alert means 309, 310 to act as a deterrent. When movement is detected in a second detection zone 107, the detection device 104 could send a data signal, using the self-forming and propagating data communications network 201, to all other detection devices 104 within the private security system 101 to operate their associated sensory alert means, including but not limited to, turning on strobe lights 110 or sirens 109, thus acting as an increased deterrent to the intruder.

The master device 120 has the ability to facilitate detection devices 104 to communicate with each other using the self-forming and propagating data communications network 401. This network uses a non-specific routing protocol, which could dynamically use one or more detection devices 104 to pass on a data signal to/from a specific detection device 104 back to the master device 120. The master device 120 also provides an internet 124 gateway for communication with the shared supervisory server 122 and individual users through their personal mobile device application 313 and/or other personal technologies 111.

The shared supervisory server 122 is located at a secure location away from the location of any private security system 101. The shared supervisory server 122 uses a communications means such as the internet 124 to provide communications with many individual private security systems 101. It could provide a web site or personal mobile device application 313 interface for the family group administrator to access information and status and control of their single system 101 via normal internet technologies.

The shared supervisory server 122 provides automated account management services for the family group administrators and community groups, and the linking/securing of the owner's/authorized person's mobile device 111 or other personal technologies to the owner's private security system 101 and community groups. The shared supervisory server 122 provides a secure portal for access to a community CCTV network.

The shared supervisory server 122 manages the database 500 which includes customer records 502 containing information 504 such as but not limited to: (i) site name; (ii) site geo-coordinate location; (iii) geo-coordinate location of all detection devices/master devices/community CCTV cameras etc.; (iv) address; (v) family group; (vi) group members current geo-coordinate locations; (vii) group/community memberships; (viii) system status; (ix) physical hardware configuration/setup; (x) application registrations; (xi) current site IP address; (xii) event log; (xiii) action log; (xiv) communications/chat history; (xv) panic logging, tracking, recording (xi) user access security/IP address and a record change history 506.

Several separate private security systems 101 installed for several individual owners could be considered as a group or community for the purpose of inter-system management, information/data exchange, notification and control by the owners/members within such a community. System membership to one group is not exclusive. One system can be a member of several groups concurrently, including but not limited to property boundary neighbors, local street, housing estate, church group, sports group, watch groups, employee groups.

Installing a private security system 101 in each home along a street or estate housing block would be considered a community security system 100 providing a curtain of security throughout the street or estate. Each home has an absolute geo co-ordinate location and each detection device 104 has an absolute geo co-ordinate location. The shared supervisory server 122 can intelligently determine when human detection from one detection device 104 at one private security area 102 needs to be shared with that of another private security area 102 (based on proximity). This has the effect of expanding a private security area's 102 security curtain beyond its private security area 102 boundary. Each community member is only installing a small part of the overall community security system 100.

At the time of a human detection, the off-site s hared supervisory server 122 can intelligently select which of the group members will be contacted based on their physical location monitored by their personal mobile device application 313. The personal mobile device application 313 can also perform the task of filtering notifications from the shared supervisory server 122 based on real-time GPS co-ordinates of the user and or user status such as administrator, home group membership etc. At the time of a human detection, the shared supervisory server 122 may interrogate the personal mobile device application 313 to determine the whereabouts of each member's personal mobile devices 111. The shared supervisory server 122 could intelligently select which of the group members will be contacted based on their physical location at the time of an intruder 115 detection and or priority listing at the time of the human movement detection, e.g., family members, neighbors, other community group members, gate house, mobile security etc. for response.

Figure 6:
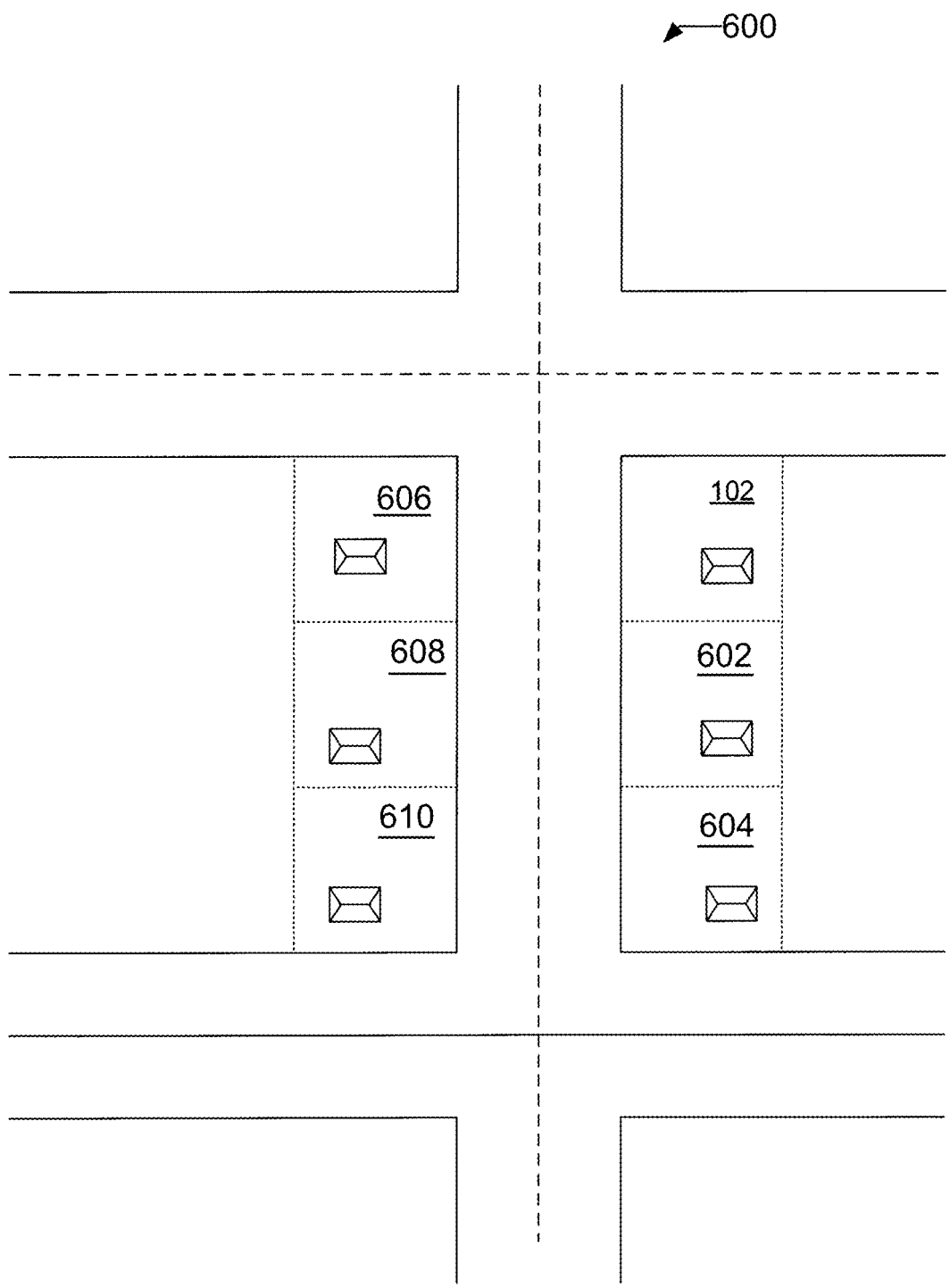
FIG. 6 illustrates a drawing of multiple private security areas forming a community security system.

FIG. 6 is a drawing 600 of private security areas 102 of FIGS. 1 and 2 and other private security areas 602-610 outside of structures are depicted. Each of the private areas 102 and 602-610 may have a private security system 101 that all communicate with a shared supervisory server 122 through a master device 120. When the private security system 101 detects an intruder 115 in the private security area 102 external to the physically secured building 130 and/or other type of restricted zone and notifies the owner/authorized person, an additional notification may be sent to other members in a group or community (such as home owners, family members or occupants of 602-610 of FIG. 6) that identifies the previous location and movements of the intruder 115. The notification may be as, but not limited to: text messages, sound prompts, voice messages, graphical descriptions and/or photos sent a user's personal mobile device 111, which may be accessible directly or via a personal mobile device application 313 interface on the users' mobile device 111.

Information provided may include, but not be limited to, identification of the property, time of intruders' movements, warnings, response and actions of other authorized users, communications/chat between authorized users. The notification to other groups or communities may be directed via the shared supervisory server 122.

By way of example, private security system 101 detects an intruder 115 in private security area 102 and notifies the owner/authorized user of the intruder 115. The private security system 101 may also notify the adjacent private security area 602 of an intruder 115 being detected via the shared supervisory server 122 internet 124 and/or self-forming and propagating data communications network 401. The private security system 101 associated with private area 602 may then go on a heightened status and actively attempt to detect an intruder 115. If a calculated directional heading a relative distance of the intruder 115 is ascertainable by the shared supervisory server 122, then more directed notices to other private security systems 101 and their home owners may occur.

The shared supervisory server 122 contains the customer record 502 related to each member and all installed hardware such as; detection devices 104 CCTV cameras 128 etc. within the community security system 100. The shared supervisory server 122 may use alarm events and other real-time event information such as; arming and disarming to conduct statistical analysis to create status reports for the purpose of further improving the overall community security. This information may be made available through the social media forum available to the community members. The shared supervisory server also facilitates access to the CCTV cameras 128, which creates the community CCTV system. Thus, event data, captured CCTV video history 325, live camera views 329 and detected intruder 115 information may be shared among multiple private security systems 101.

A website interface could integrate several third party services and technologies, including, but not limited to: a world mapping service to locate the owners property/restricted zone, obtain the geo-coordinates location of the property/restricted zone, facilitate site analysis and system design and estimation and quotation tool, goods sales/ordering and payment system, and create the customer record details on a shared supervisory server 122 to accept communications from the owner's new system, use the geo-coordinates location and social media sites such as but not limited to, Facebook and Twitter, to cross reference friend lists to analyze and recommend possible community groups to be joined, and have automated account management services for the owners and community groups, and the linking/securing of the owner's/authorized person's mobile devices 111 to the owner's system and community groups.

Although the main invention relates to human detection, it is envisioned that each private security area 102 owner within a community could install a self-powered/mains powered, wired/wireless CCTV camera 128. This camera 128 could include a recording means for gathering video history 325, a movement control means 318 (pan, tilt, zoom) and a remote review means to allow community group members to access the video history 325 and/or live camera views 329 of not just their own camera but other cameras within the community group. Each individuals/groups cost outlay is reduced but each group member has access to the larger community security system 100 network that is created. This CCTV camera network could be linked together through the LAN 409, Wi-Fi 410, and/or Internet 124 using the cellphone network such as 3G/4G or other internet gateways etc. The community CCTV camera network may be installed by a body corporate, home owners association, county, city, municipality, neighborhood, or individual members each installing one or more cameras 128 etc. for the benefit of all community members.

When installed, a physical geo-coordinate reference is associated with each camera 128 and is used to determine camera 128 selection by the members. This could be a map display of camera 128 locations or assist the member by recommending appropriate camera 128 selections for their current requirement. Footage from the camera 128 could be used by the gatehouse, security patrol, police authority etc. to aid in the identification/apprehension of an intruder 115.

Access to the CCTV camera video history 325 of live camera view 329, could be securely managed by the shared supervisory server 122 through a personal mobile device application 313, secure website, etc. The CCTV system is not used to do human 115 detection and as such, does not form a detection zone 107. It is purely used to provide live vision 329 and recorded video history 325 of general activity and/or automated detection events throughout the community.

As home owners are already members of community groups, it is envisaged that social media sharing of general information relating to individual security and community security could be contributed to and shared with other members of the community group. This information could consist of written texts, chat, photos, video, other media content etc. for the purpose of discussing, detailing, reducing and ultimately preventing criminal activity within the community.

Alarm status metrics etc. from community group member's private security systems 101 could be gathered individually or grouped for statistical analysis, presentation and review by the community group members. This could be presented as a simplistic level of probability of criminal activity. While this information is a valuable tool for this community group, it is also of value for law enforcement, aiding in the prevention of criminal activities within this community and adjacent communities.

It is intended that this social media service would be an integrated part of the website, personal mobile device application 313 and any related system application. The social media content related to community groups (as a system can be a member of more than one) is presented through the social media login page interface on the personal mobile device application 313. Each home owner's social media page would be locked to the unique identification number of the individual system and formatted based on its community group memberships, using chosen settings and preferences to filter the viewable content. The social media content uses privacy settings to allow group members to choose what is/is not publically viewable, preserving the group members' privacy.

B. Purchasing, Installing & Setting Up the System

While the system may be professionally installed, the system may also be acquired in a "Do-It-Yourself" environment over the Internet, via a store kiosk, or other means for collecting data and helping the user make remote purchasing decisions. Remote access software can help potential customers build their own security system based upon the desired private security area 101 that the user desires to monitor.

For example, a website or application hosting design software may be accessible by potential customers for purchasing a security system. The application may describe the product, product pricing, installation, operation and maintenance of the system. The software may integrate satellite mapping technology such as Google® Maps, etc to allow the system to access satellite imagery of the area that user desires to protect via a security system. The potential customer can then enter his/her street address to access the imagery and be presented with a satellite view of his/her home.

Based upon the satellite imagery and other information provided by the potential customer, the software is able to recommend system requirements such as: number of detection devices 104, type of detection devices 104, and placement of detection devices 104 around private area external to the physically secured building 130 and/or other type of restricted zone. The software may also show how the placement of the devices 104 provides overlapping monitored areas and how detection zones 107 are formed. The customer can then modify the recommended coverage as desired.

The software can ask the user to create the perimeter 105 and then calculate the area that is required to be monitored. Based upon the size of the area and the shape of any structures located within the area, the system can determine where detection devices 104 should be placed to provided optimal monitoring of the defined area within the perimeter 105. As noted above, it is desired to have two separate detection devices 104 monitor all areas. The size of the area and type of detection devices 104 selected, will dictate recommended coverage and placement of the detection devices 104 on the structures and within the perimeter 105. The customer may be given the opportunity to modify any software recommendations based upon price, coverage, etc.

Once the customer has modified his/her detection device 104 placement, the software can reanalyze this new configuration of the detection devices 104, giving further recommendations as necessary for system viability. The software can model the curtain of security around the private area external to the physically secured building 130 and/or other type of restricted zone. The software can then provide the user with a quote, and facilitate the purchasing of the system online through the use of a standard e-commerce purchasing platform.

Upon purchase, the purchaser can create a customer account that is automatically saved on the associated shared supervisory server 122 creating a customer record 502 that contains information 504 such as: name, unique identification number, community membership, geo-coordinate locations based on the Google® map. The product is then delivered to the purchaser, where it may be installed as per geo-coordinate instructions shipped with the product or available through the shared supervisory server 122 or personal mobile device application 313 in communication with the server 122.

FIG. 7a depicts a flow diagram 700 showing one example of an automated method for determining how to set-up a private security system 101 in a private security area 102 as described above. In the described example, the process is automated via an application or website. In step 702, the property is first identified by input, for example, the property address. At step 704, a satellite image map is used to display a plan view of the property. The perimeter for the secured area is then defined by the user at step 706. At step 708, the software then determines, based upon the satellite image, property boundaries and structures on the premises, the recommended detection zones 107. The software then determines the recommended type and location of the detection devices 104 on the property for optimal coverage (i.e., two detection devices 104 monitor each detection zone 107). Once the software provides the user with a recommended layout for the security system, the user is then able to review, modify and finalize the system configuration, at step 710, which once finalized is saved, associated with an installation identification number and a customer record, which is supplied to the associated governing supervisory server 122.

FIG. 7b depicts a flow diagram 720 showing one example of an automated method for determining how to install a private security system 101 in a private security area 102. In one example, for installation, the customer receives a unique identification number (or installation number) and information to download a setup application 313 to their personal mobile device 111, at step 722. Once installed, the application 313 may ask for the unique identification number assigned to the customer order. At step 724, the application 313 is then able to access the customer's account through the shared supervisory server 122 and guides the customer through installation, including but not limited to unpacking, equipment installation, communication initiation, etc.

To assist with installation, at step 726, the application 313 may show the satellite map view created during the ordering process detailing the placement of the detection devices 104. This view may be provided for the installation of each detection device 104.

When installing each device 104, at step 728, the customer may hold the first detection device 104 in the position highlighted on the personal mobile device application 313. The detection device 104 can use environmental sensors to determine that its horizontal orientation is correct. The personal mobile device application 313 then announces that it is time for the customer to attach the detection device 104 using its two stage fixing system. Once installed, the application 313 may provide for the customer to highlight the installed detection device 104 on his/her personal mobile device application 313 and confirms its actual geo-coordinate location whilst standing next to this detection device 104. This step may be repeated with the installation of each device 104. By requiring this, the application 313, at step 730, can confirm the installation of all detection devices 104 with the supervisory server 122 and record their installation location.

The application 313 may also provide for the registration and initialization of the all the detection devices 104 with the network system via the master 120 or shared supervisory server 122 and initializes system communication with all components to establish communication paths. Security keys may be used to lock communication of the new system together and may instruct the customer to verify the system using a physical walkthrough process of all monitored areas/zones 107 with, for example, onscreen personal mobile device application 313 validation.

During the setup phase, community group memberships may be selected. The personal mobile device application 313 interrogates the shared supervisory server 122 to determine or restrict groups using the geo-coordinates location, fee structure and/or social media sites such as but not limited to, Facebook and Twitter, to cross-reference friend lists. The arming/disarming regime may also be selected. Certain select pre-set features may also be modified during the set-up phase, as necessary or desired. Modifiable features may include, but not be limited to, the following: (i) engagement of audible or visual sensory alerts; (ii) notification priority for first and/or second movement detections (i.e., who receives the alert and who responds) and (iii) local requirement/restriction compliance features.

Groups may be formed, managed and notified based upon family members, mobile devices 111 associated with members of the household. Individuals added to a group may be provided with downloads of applications 313 for their personal mobile devices 111 to become group members and receive notifications. New members may be provided with a unique identification number to become members to a group. Membership can be formed and managed by an administrator, which permits group access and establishes members.

Groups can also be established based upon geography, which may be a community group or a sub-set of a community group created either by a predetermined radius around a customer's private security area 102 and/or other type of restricted zone or directly abutting neighbors. Groups could be formed based upon residences of communities, streets, official response group (gatehouse, community security, police etc.) or other defined groups, such as social groups, work colleagues and/or watch groups, to name a few.

C. System Arming/Disarming

Each private security system 101 can be manually armed and/or disarmed upon entry or exit using the personal mobile device application 313. Additionally, the private security system 101 may automatically arm or disarm itself based upon the learnt activities of group members. For example, when all of the members of a family group (personal mobile device 111 GPS geo-coordinates) leave the private area external to the physically secured building 130 and/or other type of restricted zone, the system could notify the administrator or last family group member to leave and recommend arming, if there is no response from the administrator or family group member then the private security system 101 could automatically arm itself. When a family group member (personal mobile device 111 GPS co-ordinates) returns, the private security system 101 could automatically disarm or recommend disarming.

Each personal mobile device application 313 within the family group may prompt its owner based on learned arming behavior. Should there be no response, then the system will automatically arm itself. Detection device 104 events may also assist in this process. If a family group member's personal mobile device 111 were in the private security area 102 external to the physically secured building 130 and/or other type of restricted zone, then the system would not automatically arm itself. The home group administrator has the ability to temporarily exclude a family group member's personal mobile device 111 in the event of this device 111 being misplaced or left at home. Other normal use information, including, but not limited to, environmental data and detection activity data can also be gathered to assist in the automatic management and control of the security system 101.

The security system 101 could learn the vulnerable periods and patterns of arming and disarming to automatically predict and manage the protection of the physically secured building 130 and/or other type of restricted zone. By regularly being armed and/or disarmed over an extended period of normal use, including but not limited to, a day, month or year, the system would be able to intelligently determine the vulnerable periods and patterns of arming and disarming. This would aid in the private security system 101 automatically predicting and managing the protection of the physically secured building 130 and/or other type of restricted zone by offering suggested arming and disarming times to the administrator and/or other family group member or applying such calculated suggestions automatically.

The security system 101 can learn disarming/rearming patterns from events, such as children arriving home from school or in the evening, when all family members have arrived home, the private security system 101 can rearm itself to protect the family during the hours of darkness.

D. System Management

The initial customer may be designated the system administrator. Should other family members download the personal mobile device application 313 and input the unique identification number of the family group, the administrator must authorize the joining of the group. If these new members of the group desire to become administrators, then the initial administrator is contacted and they must authorize this administrator privilege.

The system administrator may be given the ability to perform the following functions, among others: (i) change the membership within a group; (ii) change the notification order if human movement is detected (on holidays etc.); (iii) introduce a delay period when the system is armed; (iv) receive notification of low power/faulty detection devices 104; (v) control fee payment reminders (depending on the community fee structure); (vi) obtain history/statistic reports (human movement detected, system arming, system response); (vii) control automatic reporting/reordering of faulty equipment and delivery information of replacement equipment due to the shared supervisory server 122 account information/payment information and (viii) manage the group member forum and general information exchange e.g. watch out for suspicious black sedan in area.

E. Normal Usage

When the private security system 101 is disarmed, humans may move around the outside (perimeter) of the physically secured building 130 and/or other restricted zone without engaging any sensory alerts. However, in the disarmed state, the detection devices 104 may still communicate periodically with the master device/shared supervisory server 120/122, providing status reports to maintain system integrity. Should the system integrity be compromised (e.g., tampering, low power level etc.), the administrator/administrators may be notified.

When the private security system 101 is armed, which can be armed manually (through the personal mobile device application 313) or automatically (personal mobile device 111 GPS co-ordinates moving away or self-learning), a delay period may be applied to allow for a vehicle and/or person to vacate. Once the private security system 101 is in the armed state, the detection devices 104 monitor the restricted area for human movement providing a curtain of security around the perimeter of the property.

Disarming the private security system 101 can be done manually, via a personal mobile device application 313, or automatically by knowing when a family group member has arrived (personal mobile device 111 GPS co-ordinates) or through learnt movement patterns.

As a private security system 101 can be armed while family group members are inside the physically secured building 130 and/or other type of restricted zone, the private security system 101 may disarm when other family group members arrive home (personal mobile device 111 GPS co-ordinates). This can occur automatically for a pre-determined time allowing the arriving family member access to the physically secured building 130 and/or other type of restricted zone before automatically returning to the previously armed state.

F. System Breach

Figure 8:
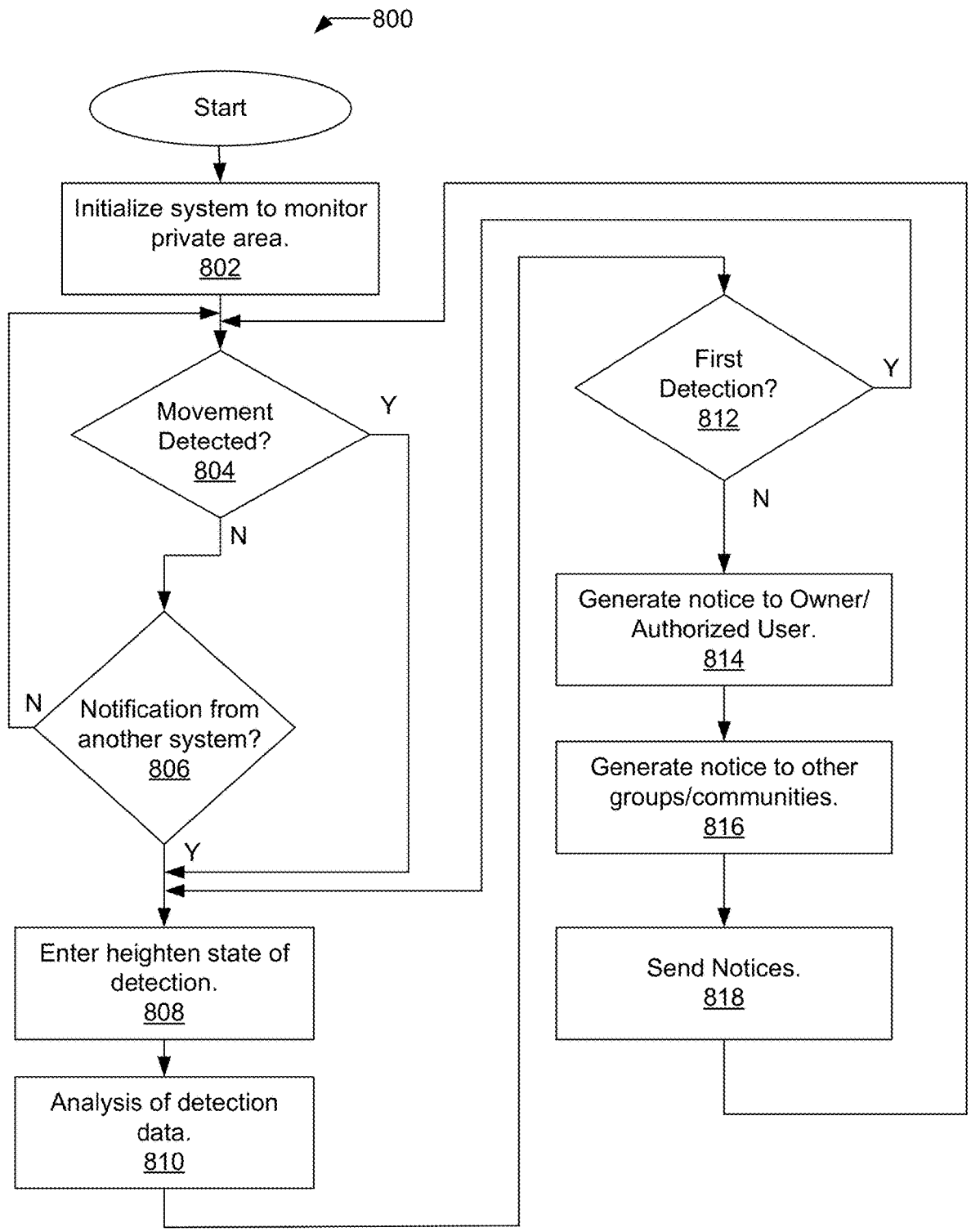
FIG. 8 depicts one example of an implementation of a flow diagram for the system handling of an approaching intruder detected by the security system.

FIG. 8 is a flow diagram outlining one example response of the system of the present invention when an intruder approaches. FIG. 8 illustrates a very basic example of one response from a private security system 101 that detects intruders in private security areas 102 and notifies users.

The intruder detection starts when the private security system 101 is initialized by being set to a ready state 802. This status is generally managed by the shared supervisory server 122 but could be duplicated with the master device 120 to provide autonomous operation. Once initialized, the detection device(s) 104 is/are in a ready state and the sensory alerts 309, 310 are placed in a standby state. If movement is detected in step 804, the private security system 101 enters a heightened state of operation in step 808, otherwise a check is made if a notification from another system, via the shared supervisory server 122 (in the current implementation) has been received in step 806. If no notification has been received in step 806, monitoring continues at step 804.

If the intruder detection system has entered a heightened state of detection in step 808, which may also be triggered by detection of further movement, an analysis of the detection data 810 is made at the supervisory server 122 or the master device 120 in step 812, additional detections may occur in step 804. Otherwise, multiple detections have occurred in step 812 and an intruder has been detected. A notice to the owner/authorized user is generated by the shared supervisory server 122 in step 814 and a notice to the other groups/communities is generated in step 816 by the shared supervisory server 122. The notices are sent in step 818 and monitoring continues. A watchdog timer is set when the first detection occurs in step 812 and reset with each additional detection occurrence. When the watchdog timer expires, the previous detection states are reset.

In summary, if the intruder approaches the property from the front, movement may be detected within a first detection zone. Visual sensory alert means (e.g. blue strobe light) may be activated as an initial deterrent, announcing to the intruder that they have been detected prior to entering the physically secured building 130 and/or other type of restricted zone. Alerting users may be reserved until the security system 101 detects continued movement around the physically secured building and/or other type of restricted zone to obtain covert access in, for example, a second detection zone.

The alert means may be escalated to an audible sensory alert means (e.g. siren, voice announcement etc.) and a visual sensory alert means (e.g. blue strobe light) located on one or all detection devices. The system administrator may be alerted of all actions. Communication of activity maybe provided through personal mobile device applications 313.

Group members may also be notified through personal mobile device application 313 when certain activities occur that require broader notification. A satellite view of the private security area 102 may be provided on the user's personal mobile device 111, through the system application, to allow physical monitoring or to illustrate certain activity and the detected location of the activity in the private security area 102. The application 313, in communication with the shared supervisory server 122, can identify the closest user for response to an intrusion investigation based upon current GPS geo-coordinate location monitored by the application 313 on personal mobile devices 111 of group members. The first or closest responder can report findings back to the other users also through the mobile application 313. All functions available via a mobile application 313 may also be made available to a user through via a website, with login account information.

If a breach is detected and an intruder 115 moves to an adjacent property or adjacent private security area 102, the detection on the second property can be immediately escalated. The community system 100 will be aware of the intruder detection and the absolute geo-coordinates of the detector 104 registering the movement so that bounding properties will be alerted in advance of movement detection that such detection should be immediately escalated. The system 100 can track the relationship between detections across the community system 100 into other private security areas 102 extending the curtain of security.

In a community system 100, as they are part of the official response group, a designated security authority such as a guardhouse can be presented with a satellite map/overview of the area covered by the curtain of security. When detection devices within this curtained area determine human movement 115, it can be plotted on a satellite map/street map/overview allowing the security authority to plot the intruder's 115 path through the curtained area. This allows the security authority to determine the whereabouts of the intruder 115 and possible path. This valuable information can be passed on to security patrols or relevant authorities such as police to aid in the apprehension of the intruder 115.

Response can be based upon members of the private security system 101 or based upon a community response group. Response groups may including groups categorized as follows: families, household members, geographic location, street group, official response group (gatehouse, community security, authorities, watch groups, work groups and/or social groups).

Community response may be based on a prioritized list or the geographic location (personal mobile device GPS co-ordinates). Any responder can use their personal mobile device application 313 to call a relevant authority such as the police if necessary. In a community or group response setting, the various system administrators/responders are kept appraised of all actions. Communication, including person-to-person communication with other group members, may be provided through a mobile application 313.

Figure 9:
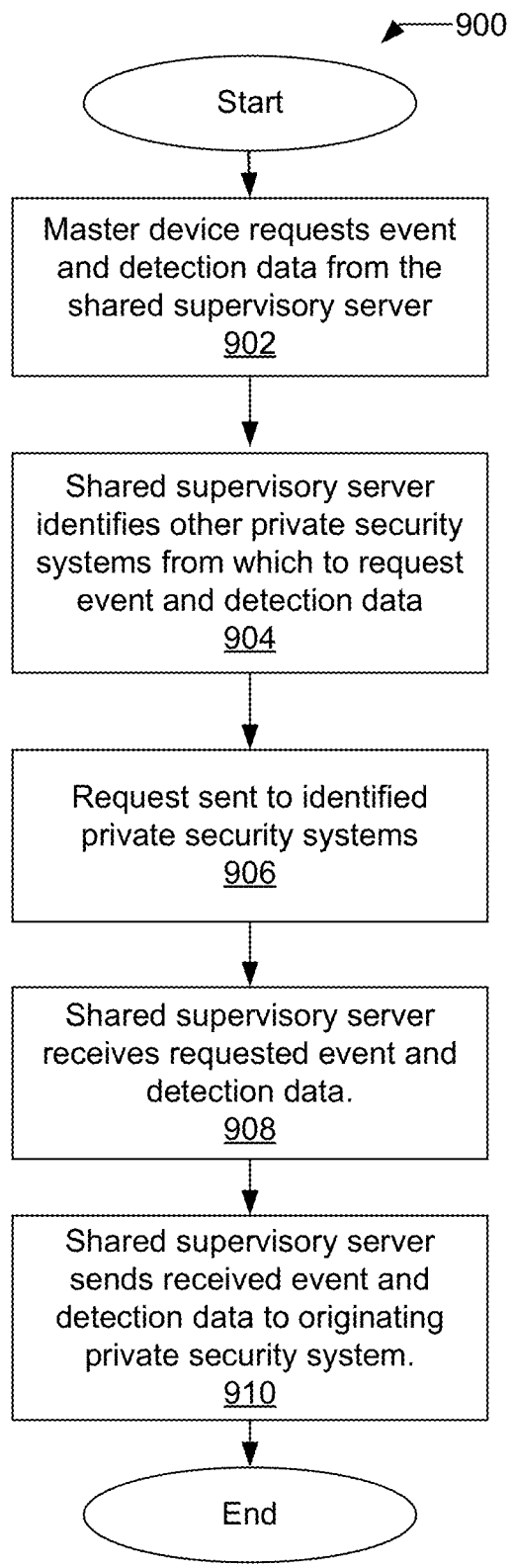
FIG. 9 depicts one example of an implementation of a flow diagram for the sharing of detection information.

In FIG. 9, a flow diagram 900 of detection information being requested from other private security systems 101 via the master device 120 is depicted in accordance with an example implementation of the invention. FIG. 9 illustrates a very basic example of a system implementation that detects intruders in private security areas 102 and that not only notifies users but also communicates with other private security systems 101 in a community environment.

In FIG. 9, at step 902, the master device 120 of a security system 101 requests event and detection data from the shared supervisory server 122. The shared server 122, at step 904 identifies other relevant security systems 101. At step 906, the shared server 122 then communicates with other security systems 101 to gather information or retrieve stored information on the shared server 122 about the relevant security systems 101. Once the shared server 122 receives or retrieves relevant data 908, it is then able to communicate the information back to the security system 910. Information may be automatically pushed or retrieved upon request. Everything can be facilitated and managed via a shared server 122 or each security system 101 may interface with the shared server 122 via a master device 120.

G. Panic Feature

The present system may also allow group members of a private 101 or community system 100 that find themselves feeling unsafe or injured whilst inside a physically secured building 130, private security area 102 or in the bounds of the community or another community to activate a panic feature from their personal mobile device application 313. The panic feature, depending upon the situation, may activate all of the sensory alerts 309, 310 in a monitored or restricted area 102, along with those of adjacent properties, immediately escalating the deterrent if an intruder 115 is present.

Depending on the response set-up, either/all of the geographic group, street group, official response group, etc. members may be notified of the panic situations initialized by members so that they are able to investigate and determine the correct response. Responders to a panic activation, may be selected dynamically at the time of the panic activation using such criteria as relative location of individual responders, even if the responders are not part of the same group or community as the person in panic.

As noted, this panic feature may also be activated in a community system 100 environment when a user is away from their private security area or restricted zone 102, for example, while walking, jogging etc. At the time of generating a panic, the user does not have to be a member of the community in which they find themselves. If the user feels threatened, is being followed, approached or in fear of abduction etc., the community group member could activate the personal mobile device application 113 panic feature.

Panic can be activated through a non-direct user action such as shaking the mobile device 111. As such, this panic feature could be engaged by shaking the personal mobile device 111 several times. The application 313 could be activated by the user before leaving his or her private security area 102 or the application could be designed to run in the background at all times so that the user would not be required to turn the screen on or push a button to start the application 313, all depending upon programming and mobile device 111 operating system restrictions and/or controls. As noted above, notification can be performed by dynamic selection, which would not require the user to provide email addresses, text messages etc. The decisions & notifications may be automatically determined by the supervisory server 122.

As the community group member is away from their own physically secured building 130 and/or private security area 102, but in close proximity of those of other community group members, and/or other community groups the personal mobile device application 313 panic feature may cause the sensory alerts 309, 310 at surrounding physically secured buildings 130 and/or private security areas 102 to be activated even if these systems are not in an armed state. This provides an immediate deterrent to the alleged perpetrator. Localised deterrent may also include audio generated from a user's phone 111, in addition to surrounding sensory alerts 309, 310.

The nearby community group members along with any relevant family group, geographic group, street group or official response group etc. members may be sent immediate notification through their personal mobile device application 313 informing them which community group member is in distress and their location allowing any nearby community group member to respond. Optionally, which group members are informed of these occurrences may be managed through the personal mobile device 111 GPS co-ordinates so that only those nearby are notified. The real-time GPS location of the user in panic may be presented in map form to the responders.

By notifying those closest to the user, assistance to the user in panic may be provided immediately by the local responders. Users are not required to wait for a predefined list of emergency contacts to respond. Further, the application 313 can allow responders to a panic situation to communicate with each other through the application 313 to coordinate the required response or call emergency services and police if required.

The distressed community group member's personal mobile device 111 GPS co-ordinates are constantly monitored until the panic has been manually cancelled on their personal mobile device application 313. Additionally, the microphone/camera of their personal mobile device 111 could be activated and the gathered audio/video information could be recorded locally or sent to the shared supervisory server 122 for storage and/or later retrieval for evidence purposes. Thus, on panic being activated the camera picture & microphone audio and real-time GPS tracking will all be gathered & transported to an offsite server 122 for recording. Playback of the recorded video/audio/GPS tracking from the offsite server 122 can be made available for later review (Police, FBI, authorised users, etc.).

While the primary purpose of the panic feature is personal safety within a community, those skilled in the art will recognize the application of this panic feature outside of one's own community. The benefits within the one's community or within similarly situated communities are undeniable.

Figure 10:
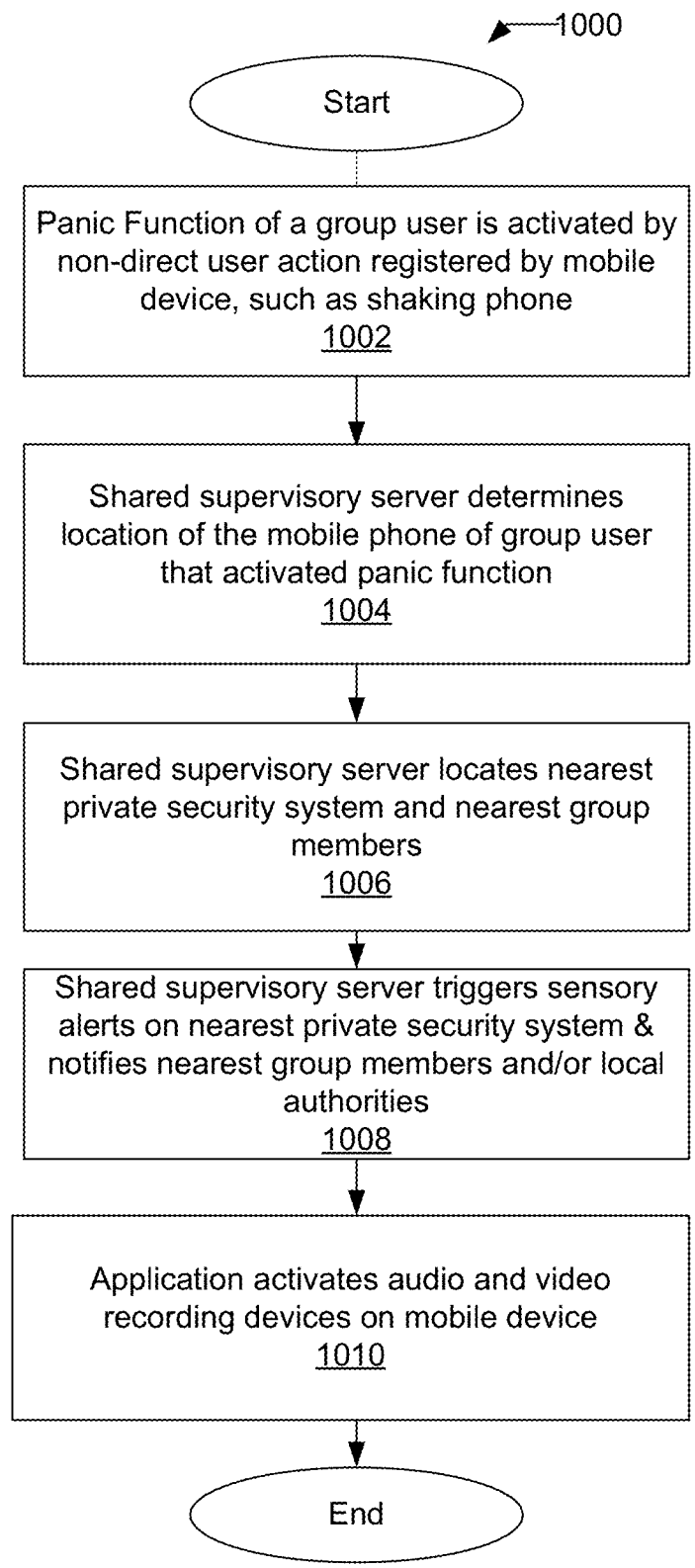
FIG. 10 depicts a flow diagram of one example of an implementation of a panic feature for use in connection with a community user's mobile device.

FIG. 10 depicts a flow diagram 1000 of one example of an implementation of a panic feature for use in connection with a community user's mobile device. As illustrated in FIG. 10, the panic function on the personal mobile device application 313 of a group user is activated by non-direct user action registered by mobile device 111, such as shaking phone at step 1002. Once the panic function is activated, a notification is sent to the shared supervisory server 122 and the shared supervisory server 122 then determines the location of the mobile phone 111 of the group user that activated panic function, at step 1004. Once the location of the user is determined, at step 1006, the shared supervisory server 122 locates the nearest private security system 101 and nearest group members to the user. The shared supervisory server 122 then triggers sensory alerts on nearest private security system & notifies nearest group members and/or local authorities of the user's location and panic situation, at step 1008. Simultaneously, with activation of the panic function, the mobile device application 131 also activates the audio and video recording features on the mobile device 111 and, optionally, triggers sensor alerts on the mobile device 111, at step 1010.

Examples of the invention are discussed herein with reference to FIGS. 1-10; however, those skilled in the art will readily appreciate that the detailed description given herein with respect to these figures is for explanatory purposes as the invention extends beyond these limited embodiments. For example, it should be appreciated that those skilled in the art will, in light of the teachings of the present invention, recognize a multiplicity of alternate and suitable approaches, depending upon the needs of the particular application, to implement the functionality of any given detail described herein, beyond the particular implementation choices in the following embodiments described and shown. That is, there are numerous modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

It is to be further understood that the present invention is not limited to the particular methodology, compounds, materials, manufacturing techniques, uses, and applications, described herein, as these may vary. It is also to be understood that the terminology used herein is used for the purpose of describing particular embodiments only, and is not intended to limit the scope of the present invention. It must be noted that as used herein and in the appended claims, the singular forms "a," "an," and "the" include the plural reference unless the context clearly dictates otherwise. Thus, for example, a reference to "an element" is a reference to one or more elements and includes equivalents thereof known to those skilled in the art. Similarly, for another example, a reference to "a step" or "a means" is a reference to one or more steps or means and may include sub-steps and subservient means. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

Unless defined otherwise, all technical and scientific terms used herein have the same meanings as commonly understood by one of ordinary skill in the art to which this invention belongs. Preferred methods, techniques, devices, and materials are described, although any methods, techniques, devices, or materials similar or equivalent to those described herein may be used in the practice or testing of the present invention. Structures described herein are to be understood also to refer to functional equivalents of such structures. The present invention will now be described in detail with reference to embodiments thereof as illustrated in the accompanying drawings.

From reading the present disclosure, other variations and modifications will be apparent to persons skilled in the art. Such variations and modifications may involve equivalent and other features which are already known in the art, and which may be used instead of or in addition to features already described herein.

Although claims have been formulated in this application to particular combinations of features, it should be understood that the scope of the disclosure of the present invention also includes any novel feature or any novel combination of features disclosed herein either explicitly or implicitly or any generalization thereof, whether or not it relates to the same invention as presently claimed in any claim and whether or not it mitigates any or all of the same technical problems as does the present invention.

Features that are described in the context of separate embodiments may also be provided in combination in a single embodiment. Conversely, various features which are, for brevity, described in the context of a single embodiment, may also be provided separately or in any suitable subcombination. The applicants hereby give notice that new claims may be formulated to such features and/or combinations of such features during the prosecution of the present Application or of any further application derived there from.

References to an "example," "implementation" or "embodiment" may indicate that the invention so described may include a particular feature, structure, or characteristic, but not every example, implementation or embodiment necessarily includes the particular feature, structure, or characteristic. Further, repeated use of the phrases "in one example," "in one implementation," or "in one embodiment," do not necessarily refer to the same example, implementation or embodiment, although they may.

As is well known to those skilled in the art many careful considerations and compromises typically must be made when designing for the optimal manufacture of a commercial implementation any system, and in particular, the embodiments of the present invention. A commercial implementation in accordance with the spirit and teachings of the present invention may be configured according to the needs of the particular application, whereby any aspect(s), feature (s), function(s), result(s), component(s), approach(es), or step(s) of the teachings related to any described embodiment of the present invention may be suitably omitted, included, adapted, mixed and matched, or improved and/or optimized by those skilled in the art, using their average skills and known techniques, to achieve the desired implementation that addresses the needs of the particular application.

A "computer" may refer to one or more apparatus and/or one or more systems that are capable of accepting a structured input, processing the structured input according to prescribed rules, and producing results of the processing as output. Examples of a computer may include: a computer; a stationary and/or portable computer; a computer having a single processor, multiple processors, or multi-core processors, which may operate in parallel and/or not in parallel; a general purpose computer; a supercomputer; a mainframe; a super mini-computer; a mini-computer; a workstation; a micro-computer; a server; a client; an interactive television; a web appliance; a telecommunications device with internet access; a hybrid combination of a computer and an interactive television; a portable computer; a tablet personal computer (PC); a personal digital assistant (PDA); a portable telephone; application-specific hardware to emulate a computer and/or software, such as, for example, a digital signal processor (DSP), a field-programmable gate array (FPGA), an application specific integrated circuit (ASIC), an application specific instruction-set processor (ASIP), a chip, chips, a system on a chip, or a chip set; a data acquisition device; an optical computer; a quantum computer; a biological computer; and generally, an apparatus that may accept data, process data according to one or more stored software programs, generate results, and typically include input, output, storage, arithmetic, logic, and control units.

"Software" may refer to prescribed rules to operate a computer. Examples of software may include: code segments in one or more computer-readable languages; graphical and or/textual instructions; applets; pre-compiled code; interpreted code; compiled code; and computer programs.

A "computer system" may refer to a system having one or more computers, where each computer may include computer-readable medium embodying software to operate the computer or one or more of its components. Examples of a computer system may include: a distributed computer system for processing information via computer systems linked by a network; two or more computer systems connected together via a network for transmitting and/or receiving information between the computer systems; a computer system including two or more processors within a single computer; and one or more apparatuses and/or one or more systems that may accept data, may process data in accordance with one or more stored software programs, may generate results, and typically may include input, output, storage, arithmetic, logic, and control units.

A "network" may refer to a number of computers and associated devices that may be connected by communication facilities. A network may involve permanent connections such as cables or temporary connections such as those made through telephone or other communication links. A network may further include hard-wired connections (e.g., coaxial cable, twisted pair, optical fiber, waveguides, etc.) and/or wireless connections (e.g., radio frequency waveforms, free-space optical waveforms, acoustic waveforms, etc.). Examples of a network may include: an internet, such as the Internet; an intranet; a local area network (LAN); a wide area network (WAN); and a combination of networks, such as an internet and an intranet.

Exemplary networks may operate with any of a number of protocols, such as Internet protocol (IP), asynchronous transfer mode (ATM), and/or synchronous optical network (SONET), user datagram protocol (UDP), IEEE 802.x, etc.

Embodiments of the present invention may include apparatuses for performing the operations disclosed herein. An apparatus may be specially constructed for the desired purposes, or it may comprise a general-purpose device selectively activated or reconfigured by a program stored in the device.

Embodiments of the invention may also be implemented in one or a combination of hardware, firmware, and software. They may be implemented as instructions stored on a machine-readable medium, which may be read and executed by a computing platform to perform the operations described herein.

In the following description and claims, the terms "computer program medium" and "computer readable medium" may be used to generally refer to media such as, but not limited to, removable storage drives, a hard disk installed in hard disk drive, and the like. These computer program products may provide software to a computer system. Embodiments of the invention may be directed to such computer program products.

An algorithm is generally considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, and as may be apparent from the following description and claims, it should be appreciated that throughout the specification descriptions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices. In a similar manner, the term "processor" or "controller" may refer to any device or portion of a device that processes electronic data from registers and/or memory to transform that electronic data into other electronic data that may be stored in registers and/or memory. A "computing platform" may comprise one or more processors.

It will be understood, and is appreciated by persons skilled in the art, that one or more processes, sub-processes, or process steps described in connection with FIGS. 7, 8, 9 and 10 may be performed by hardware and/or software (machine readable instructions). If a server is described (master device may be implemented as a server), the term "server" may mean a combination of hardware and software operating together as a dedicated server or it may mean software executed on a server to implement the approach previously described. If the process is performed by software, the software may reside in software memory (not shown) in a suitable electronic processing component or system such as one or more of the functional components or modules schematically depicted in the figures.

The software in software memory may include an ordered listing of executable instructions for implementing logical functions (that is, "logic" that may be implemented either in digital form such as digital circuitry or source code or in analog form such as analog circuitry or an analog source such an analog electrical, sound or video signal), and may selectively be embodied in any computer-readable medium for use by or in connection with an instruction execution system, apparatus, or device, such as a computer-based system, processor-containing system, or other system that may selectively fetch the instructions from the instruction execution system, apparatus, or device and execute the instructions. In the context of this disclosure, a "computer-readable medium" is any tangible means that may contain or store the program for use by or in connection with the instruction execution system, apparatus, or device. The tangible computer-readable medium may selectively be, for example, but is not limited to, an electronic, magnetic, optical, electromagnetic, infrared, or semiconductor system, apparatus or device. More specific examples, but nonetheless a non-exhaustive list, of tangible computer-readable media would include the following: a portable computer diskette (magnetic), a random access memory (RAM) (electronic), a read-only memory (ROM) (electronic), an erasable programmable read-only memory (EPROM or Flash memory) (electronic) and a portable compact disc read-only memory (CDROM) (optical). Note that the computer-readable medium may even be paper (punch cards or punch tape) or another suitable medium upon which the instructions may be electronically captured, then compiled, interpreted or otherwise processed in a suitable manner if necessary, and stored in a computer memory.

The foregoing detailed description of one or more embodiments of the intruder detection method and system has been presented herein by way of example only and not limitation. It will be recognized that there are advantages to certain individual features and functions described herein that may be obtained without incorporating other features and functions described herein. Moreover, it will be recognized that various alternatives, modifications, variations, or improvements of the above-disclosed embodiments and other features and functions, or alternatives thereof, may be desirably combined into many other different embodiments, systems or applications. Presently unforeseen or unanticipated alternatives, modifications, variations, or improvements therein may be subsequently made by those skilled in the art which are also intended to be encompassed by the appended claims. Therefore, the spirit and scope of any appended claims should not be limited to the description of the embodiments contained herein.

The invention claimed is:

1. A method for sharing security footage captured by a community security system to group members of the community security system, the method comprising the steps of:
providing at least one camera in a first security system for capturing security footage in a first detection zone, where the first security system is monitored by a first property occupant;
providing at least one camera in a second security system for capturing security footage in a second detection zone, where the second security system is monitored by a second property occupant;
providing at least one server in network communication with the first and second security system;
transmitting the security footage captured by either the at least one camera in the first and second security system to the at least one server; and
determining the geo-location of the at least one camera in either the first and second security system and sharing the security footage captured by either the at least one camera in the first and second security system from the at least one server to the group members of the community security system located closest to the geo-location.

2. The method of claim 1, where the group members comprise of law enforcement responders.

3. The method of claim 1, where the group members comprise of emergency responders.

4. The method of claim 1, where the security footage captured by the at least one camera in either the first or second security system is viewable by the group members in real-time.

5. The method of claim 1, where the geo-location is presented in map form to those group members located within the same geo-location of the at least one of the at least one camera.

6. The method of claim 1, where the security footage captured by either the at least one camera in the first and second security system is shared from the at least one server to the group members of the community security system only when the security footage detects movement.

7. The method of claim 1, where the group members have connected devices in network communication with the at least one server.

8. A method for sharing security footage captured by a community security system to group members of the community security system, the method comprising the steps of:
   providing multiple security systems within a community, where each security system includes at least one camera for detecting movement around at least one detection zone within the community, where the group members have devices in network communication with the at least one camera for receiving security footage captured by the at least one camera;
   providing at least one server, where the devices of the group members are in communication with the at least one server for receiving the security footage of movement around the area of at least one of the at least one detection zone within the community;
   transmitting the security footage to the at least one server; and
   determining which of the group members of the community security system are located closest to the at least one camera and sharing the security footage captured by at least one of the at least one camera to those group members.

9. Then method of claim 8, where the group members comprise of law enforcement responders.

10. Then method of claim 8, where the group members comprise of emergency responders.

11. The method of claim 8, where the geo-location is presented in map form to the group members.

12. The method of claim 8, where each security system is monitored by separate property occupants.

13. The method of claim 8, where the security footage detects a security alert and where the security footage detection of the security alert is shared with the group members.

14. The method of claim 8, the method further comprising the step of determining the geo-location of the at least one of the least one camera and sharing the security footage to group members located closest to the geo-location.

15. The method of claim 14, where the geo-location is presented in map form to those group members located within the same geo-location of the at least one of the at least one camera.

16. A community security system for sharing security footage captured by the community security system to group members of the community security system, where the community security system has at least two security areas each monitored by individual security systems, where each individual security system includes a camera and is monitored by a separate property occupant, and a server in network communication with each individual security system, where the server is configured to determine the geo-location of each camera and facilitates the sharing of security footage captured by the cameras in the individual security systems to the group members of the community security system located closest to the geo-location of the cameras.

17. Then community security system of claim 16, where the group members comprise of law enforcement responders.

18. The community security system of claim 16, where the group members comprise of emergency responders.

19. The community security system of claim 16, where the security footage is viewable by the group members in real-time.

20. The community security system of claim 16, where the security footage detects a security alert and where the security footage detection of the security alert is shared with the group members.

* * * * *